(12) United States Patent
Saragih et al.

(10) Patent No.: US 12,190,428 B2
(45) Date of Patent: *Jan. 7, 2025

(54) DEEP RELIGHTABLE APPEARANCE MODELS FOR ANIMATABLE FACE AVATARS

(71) Applicant: Meta Platforms Technologies, LLC, Menlo Park, CA (US)

(72) Inventors: Jason Saragih, Pittsburgh, PA (US); Stephen Anthony Lombardi, Pittsburgh, PA (US); Shunsuke Saito, Pittsburgh, PA (US); Tomas Simon Kreuz, Pittsburgh, PA (US); Shih-En Wei, Pittsburgh, PA (US); Kevyn Alex Anthony McPhail, Pittsburgh, PA (US); Yaser Sheikh, Pittsburgh, PA (US); Sai Bi, La Jolla, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,647

(22) Filed: Jun. 13, 2023

(65) Prior Publication Data
US 2023/0326112 A1  Oct. 12, 2023

Related U.S. Application Data

(63) Continuation of application No. 17/580,486, filed on Jan. 20, 2022, now Pat. No. 11,715,248.
(Continued)

(51) Int. Cl.
*G06T 13/40* (2011.01)
*G06T 11/00* (2006.01)
(Continued)

(52) U.S. Cl.
CPC ............ *G06T 13/40* (2013.01); *G06T 11/001* (2013.01); *G06T 15/04* (2013.01); *G06T 15/506* (2013.01); *G06T 15/60* (2013.01); *G06T 2215/12* (2013.01)

(58) Field of Classification Search
CPC ....... G06T 11/001; G06T 13/40; G06T 15/04; G06T 15/20; G06T 15/506; G06T 15/60; G06T 2215/12
See application file for complete search history.

(56) References Cited

U.S. PATENT DOCUMENTS

| | | | |
|---|---|---|---|
| 2013/0222408 A1* | 8/2013 | Lee | G09G 3/3466 345/589 |
| 2019/0213772 A1 | 7/2019 | Lombardi et al. | |

(Continued)

FOREIGN PATENT DOCUMENTS

WO    2017029488 A2    2/2017

OTHER PUBLICATIONS

Huang, Xiang, et al. "Near light correction for image relighting and 3D shape recovery." 2015 Digital Heritage. vol. 1. IEEE, 2015. (Year: 2015).*

(Continued)

*Primary Examiner* — Daniel F Hajnik
(74) *Attorney, Agent, or Firm* — McDermott Will & Emery LLP

(57) ABSTRACT

A method for providing a relightable avatar of a subject to a virtual reality application is provided. The method includes retrieving multiple images including multiple views of a subject and generating an expression-dependent texture map and a view-dependent texture map for the subject, based on the images. The method also includes generating, based on the expression-dependent texture map and the view-dependent texture map, a view of the subject illuminated by a light (Continued)

source selected from an environment in an immersive reality application, and providing the view of the subject to an immersive reality application running in a client device. A non-transitory, computer-readable medium storing instructions and a system that executes the instructions to perform the above method are also provided.

20 Claims, 17 Drawing Sheets

Related U.S. Application Data

(60) Provisional application No. 63/141,871, filed on Jan. 26, 2021.

(51) Int. Cl.
    *G06T 15/04*     (2011.01)
    *G06T 15/50*     (2011.01)
    *G06T 15/60*     (2006.01)

(56) References Cited

U.S. PATENT DOCUMENTS

| | | | |
|---|---|---|---|
| 2021/0067840 A1* | 3/2021 | Mate | A63F 13/65 |
| 2021/0287416 A1 | 9/2021 | O'Hagan et al. | |
| 2021/0366184 A1 | 11/2021 | Leroux et al. | |

OTHER PUBLICATIONS

Loscos, Céline, et al. "Interactive virtual relighting and remodeling of real scenes." Rendering Techniques' 99: Proceedings of the Eurographics Workshop in Granada, Spain, Jun. 21-23, 1999 10. Springer Vienna, 1999. (Year: 1999).*
Havran, Vlastimil, et al. "Interactive System for Dynamic Scene Lighting using Captured Video Environment Maps." Rendering Techniques. 2005. (Year: 2005).*
Busbridge I.W., "The Mathematics of Radiative Transfer," Cambridge University Press, 1960, No. 50, 81 pages.
Cao C., et al., "Real-Time High-Fidelity Facial Performance Capture," ACM Transactions on Graphics (TOG), 2015, vol. 34, No. 4, pp. 1-9.
Debevec P., et al., "Acquiring the Reflectance Field of a Human Face," Proceedings of the 27th Annual Conference on Computer Graphics and Interactive Techniques, 2000, pp. 145-156.
Garrido P., et al., "Reconstructing Detailed Dynamic Face Geometry from Monocular Video," ACM Transactions on Graphics, 2013, vol. 32, pp. 1-10.
Ghosh A., et al., "Practical Modeling and Acquisition of Layered Facial Reflectance," In ACM SIGGRAPH Asia 2008 papers, 2008, pp. 1-10.
Gotardo P., et al., "Practical Dynamic Facial Appearance Modeling and Acquisition," ACM Transactions on Graphics (ToG), Dec. 2018, vol. 37, No. 6, Article 232, pp. 1-13, Retrieved from the Internet: URL: https://doi.org/10.1145/3272127.3275073.
Guo K., et al., "The Relightables: Volumetric Performance Capture of Humans with Realistic Relighting," ACM Transactions on Graphics, Article 217, vol. 38(6), Nov. 2019, pp. 1-19.
Ha D., et al., "HyperNetworks," ArXiv Preprint Arxiv: 1609.09106V4, Dec. 1, 2016, 29 pages.

EPO—International Search Report and Written Opinion for International Application No. PCT/US2022/013820, mailed Jun. 7, 2022, 11 pages.
Jensen H.W., "A Practical Model for Subsurface Light Transport," In Proceedings of the 28th Annual Conference on Computer Graphics and Interactive Techniques, 2001, pp. 511-518.
Kingma; et al., "ADAM: A Method for Stochastic Optimization," ArXir:1412.6980v1, Dec. 22, 2014, 9 pages.
Lombardi S., et al., "Deep Appearance Models for Face Rendering," ACM Transactions on Graphics, Aug. 2018, vol. 37 (4), Article 68, pp. 1-13.
Ma W-C., et al., "Rapid Acquisition of Specular and Diffuse Normal Maps from Polarized Spherical Gradient Illumination," Rendering Techniques, 2007, vol. 9, 12 pages.
Meka A., et al., "Deep Reflectance Fields: High-Quality Facial Reflectance Field Inference from Color Gradient Illumination," ACM Transactions on Graphics (TOG), 2019, vol. 38, No. 4, pp. 1-12.
Meka A., et al., "Deep Relightable Textures—Volumetric Performance Capture with Neural Rendering," ACM Transactions on Graphics Proceedings SIGGRAPH Asia, 2020, vol. 39, No. 6, Article 259, pp. 1-21, Retrieved from the Internet: URL: https://doi.org/10.1145/3414685.3417814.
Nagano K., et al., "paGAN: Real-time Avatars Using Dynamic Textures," ACM Transactions on Graphics (TOG), vol. 37, No. 6, Nov. 2018, 12 pages.
Pighin F., et al., "Synthesizing Realistic Facial Expressions from Photographs," International Conference on Computer Graphics and Interactive Techniques, ACM SIGGRAPH, Jul. 30, 2006, 10 pages.
Schwartz G., et al., "The Eyes Have It: An Integrated Eye and Face Model for Photorealistic Facial Animation," ACM Transactions on Graphics (TOG), Jul. 2020, vol. 39, No. 4, 15 Pages.
Sevastopolsky A., et al., "Relightable 3D Head Portraits from a Smartphone Video," Arxiv, Dec. 17, 2020, 15 pages.
Seymour M., "Meet Mike: Epic Avatars," In ACM SIGGRAPH VR Village, 2017, 2 pages.
Shu Z., et al., "Neural Face Editing with Intrinsic Image Disentangling," In Proceedings of the IEEE Conference on Computer Vision and Pattern Recognition, 2017, pp. 5541-5550.
Sun T., et al., "Single Image Portrait Relighting," ACM Transactions on Graphics (TOG), Jul. 2019, vol. 38, No. 4, Article 79, pp. 1-12, Retrieved from the Internet: URL: https://doi.org/10.1145/3306346.3323008.
Tewari A., et al., State of the Art on Neural Rendering, State of The Art Report (STAR), May 2020, vol. 39, No. 2, 27 pages.
Wenger A., et al., "Performance Relighting and Reflectance Transformation with Time-Multiplexed Illumination," ACM Transactions on Graphics (TOG), 2005, vol. 24, No. 3, pp. 756-764.
Weyrich T., et al., "Analysis of Human Faces using a Measurement-Based Skin Reflectance Model," ACM Transactions on Graphics (TOG), 2006, vol. 25, No. 3, pp. 1013-1024.
Williams L., "Casting Curved Shadows on Curved Surfaces," In Proceedings of the 5th Annual Conference on Computer Graphics and Interactive Techniques, 1978, pp. 270-274.
Xu Z., et al., "Deep Image-Based Relighting from Optimal Sparse Samples," ACM Transactions on Graphics (TOG), 2018, vol. 37, No. 4, Article 126, pp. 1-13.
Yamaguchi S., et al., "High-Fidelity Facial Reflectance and Geometry Inference from an Unconstrained Image," ACM Transactions on Graphics (TOG), 2018, vol. 37, No. 4, Article 162, pp. 1-14.
Zhang X., et al., "Neural Light Transport for Relighting and View Synthesis," ACM Transactions on Graphics (TOG), 2020, vol. 40, No. 1, Article 9, pp. 1-17.

* cited by examiner

DEEP RELIGHTABLE APPEARANCE MODELS FOR ANIMATABLE FACE AVATARS

CROSS-REFERENCE TO RELATED APPLICATIONS

This application claims priority under 35 U.S.C. § 120 as a continuation of U.S. patent application Ser. No. 17/580,486, filed Jan. 20, 2022, to Saragih, et al., entitled DEEP RELIGHTABLE APPEARANCE MODELS FOR ANIMATABLE FACE AVATARS, which claims the benefit of U.S. Provisional Application No. 63/141,871, filed on Jan. 26, 2021, to Saragih, et al., entitled DEEP RELIGHTABLE APPEARANCE MODELS FOR ANIMATABLE FACE AVATARS, the contents of which are hereby incorporated by reference, in their entirety, for all purposes.

BACKGROUND

Field

The present disclosure is related generally to the field of generating three-dimensional computer models of subjects in a video capture. More specifically, the present disclosure is related to generating relightable three-dimensional computer models of human faces for use in virtual reality and augmented reality (VR/AR) applications.

Related Art

Animatable photorealistic digital humans are a key component for enabling social telepresence, with the potential to open up a new way for people to connect while unconstrained to space and time. The ability to adjust lighting conditions for a given three-dimensional computer model is highly desirable, to immerse an avatar in a virtual scene of choice. Typically, three-dimensional (3D) rendering models have been limited to a single lighting condition, or use lighting models that are fast to render but result in unrealistic appearance, or require intensive processing that achieves realism but precludes real-time applications. Some learning-based relighting approaches have been applied on two-dimensional (2D) images, static scenes, or performance replay. However, these applications are not suitable for generating dynamic renderings under novel expressions and lighting conditions.

Figure 1:
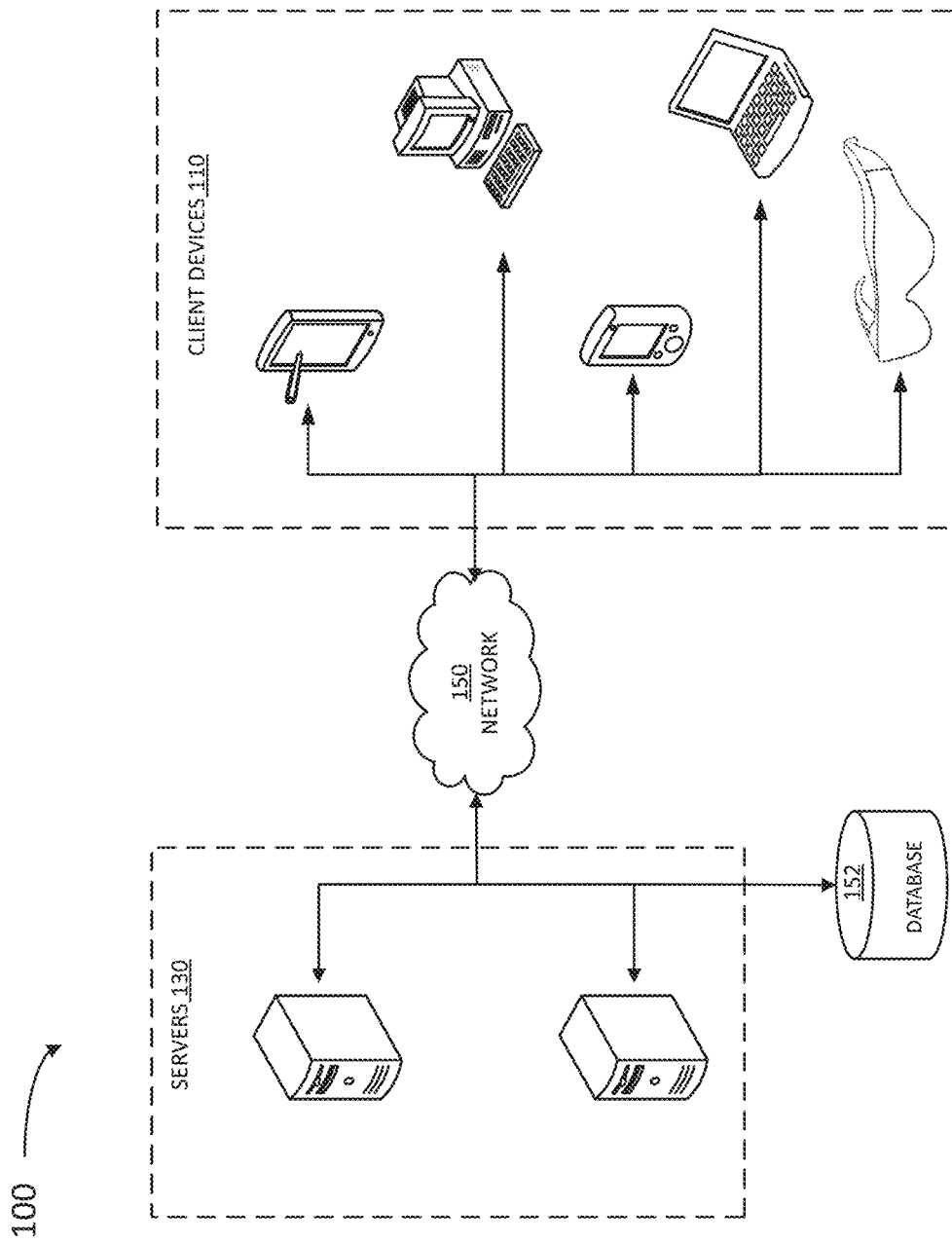
FIG. 1 illustrates an example architecture suitable for providing a real-time, clothed subject animation in a virtual reality environment, according to some embodiments.

In the figures, elements having the same or similar label share the same or similar features, unless expressly stated otherwise.

SUMMARY

In a first embodiment, a computer-implemented method includes retrieving multiple images including multiple views of a subject and generating an expression-dependent texture map and a view-dependent texture map for the subject, based on the images. The computer-implemented method also includes generating, based on the expression-dependent texture map and the view-dependent texture map, a view of the subject illuminated by a light source selected from an environment in an immersive reality application, and providing the view of the subject to an immersive reality application running in a client device.

In a second embodiment, system includes a memory storing multiple instructions and one or more processors configured to execute the instructions to cause the system to perform operations. The operations include to retrieve multiple images including multiple views of a subject, to generate an expression-dependent texture map and a view-dependent texture map for the subject, based on the images, to generate, based on the expression-dependent texture map and the view-dependent texture map, a view of the subject illuminated by a light source selected from an environment in an immersive reality application, and to provide the view of the subject to an immersive reality application running in a client device.

In a third embodiment, a computer-implemented method for training a model to generate a relightable, three-dimensional representation of a subject includes retrieving multiple images including multiple views of a subject under multiple space-multiplexed and time-multiplexed illumination patterns. The computer-implemented method also includes generating, with a relightable appearance model, an expression-dependent texture map and a view-dependent texture map for the subject, based on the images, generating, based on the expression-dependent texture map and the view-dependent texture map, a synthetic view of the subject illuminated by each of the space-multiplexed and time-multiplexed illumination patterns, and determining a loss value indicative of a difference between the synthetic view of the subject and at least one of the images including multiple views of the subject. The computer-implemented method also includes updating the relightable appearance model based on the loss value, and storing the relightable appearance model in a memory circuit.

In yet other embodiments, a system includes a first means for storing instructions and a second means for executing the instructions to cause the system to perform a method. The method includes retrieving multiple images including multiple views of a subject, and generating an expression-dependent texture map and a view-dependent texture map for the subject, based on the images. The method also includes generating, based on the expression-dependent texture map and the view-dependent texture map, a view of the subject illuminated by a light source selected from an environment in an immersive reality application, and providing the view of the subject to an immersive reality application running in a client device.

In another embodiment, a non-transitory, computer-readable medium stores instructions which, when executed by a computer processor, cause a computer to perform a method. The method includes retrieving multiple images including multiple views of a subject, and generating an expression-dependent texture map and a view-dependent texture map for the subject, based on the images. The method also includes generating, based on the expression-dependent texture map and the view-dependent texture map, a view of the subject illuminated by a light source selected from an environment in an immersive reality application, and providing the view of the subject to an immersive reality application running in a client device.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Real-time rendering and animation of dynamic representations of humans is one of the cornerstones for games, movies, and VR telepresence applications. Embodiments as disclosed herein provide personalized expressive face avatars that can be rendered from novel viewpoints and relit to match the lighting in novel environments. Some embodiments leverage the representation power of neural networks to map viewpoint, expression, and lighting to highly accurate texture and geometry, which may be used to synthesize an image using rasterization techniques.

Avatar creation has seen a notable increase in the use of learning-based techniques recently. Traditional physically-inspired methods use precise geometry and reflectance, where costly and time-consuming manual cleanup is typically used. In contrast, learning-based methods use general function approximators in the form of deep neural networks to faithfully model the appearance of human faces. Learning-based methods can achieve impressive realism with automated pipelines without relying on precise estimates of face geometry and material properties. Learning-based methods also exhibit an efficient functional form that enables real-time generation and rendering in demanding applications such as VR applications, where classical ray-tracing methods can be too computationally intensive. Despite their many advantages, avatars created using learning-based techniques have been limited to single lighting conditions. Some examples include avatars that support novel viewpoints and expressions, but their model is limited to the uniform lighting condition under which the data was captured. Although there has been great progress in learning-based relighting, existing methods are limited to 2D images, static scenes, or performance replay, which are not suitable for generating dynamic renderings under novel expressions and lighting conditions. This limitation has prevented the broader adoption of learning-based avatars in game and film production, where consistency between character and environment is desirable.

To solve the above technical problems arising in the field of virtual reality applications in computer networks, embodiments disclosed herein include a learning-based method for building relightable avatars (e.g., a Deep Relightable Appearance Model -DRAM-). In some embodiments, a DRAM supports rendering under novel viewpoints, novel expressions, and can be rendered under novel lighting conditions to reconstruct complex visual phenomena such as specularities, glints, and subsurface scattering. In some embodiments, a relightable model as disclosed herein is built from light-stage captures of dynamic performances under a sparse set of space- and time-multiplexed illumination patterns. Also disclosed are training methods using a variational auto-encoder framework, which produces a well-structured latent space of expressions that is suitable for animation. To avoid overfitting the lighting conditions observed during capture, some embodiments leverage the additive property of light transmission, and generate expression-dependent and view-dependent textures for each light in the scene, which are then fused with intensity-defined weights into a final lit texture. In some embodiments, the lighting information is fed at a later stage of the decoder network, instead of at its bottleneck, e.g., a late conditioned DRAM,(DRAM$\ell$). A late condition model affords generalization to completely unseen lighting environments including both distant directional lighting and real environment maps, and exhibits smooth interpolation of point light sources despite a discrete set of 460 lights used during capture. Moreover, a late conditioned model can generate compelling near-field illumination effects, which are particularly challenging for a learning-based approach that exclusively uses data with distant light sources.

In some configurations (e.g., natural environments), the large number of illuminating directions make it computationally challenging to generate a real-time model. To resolve this limitation, some embodiments include an early-conditioned deep neural network that inputs the desired lighting condition at the network's bottleneck with enough capacity and is more efficient to evaluate.

A DRAM$\ell$ as disclosed herein generates renderings of a human face under a large number of natural illumination conditions, which is then used to train an efficient early-conditioned DRAM (DRAM$\in$), obviating the need for it to extrapolate to those conditions during test time. Thus, some embodiments include a DRAM$\ell$ to generate a large number of high-quality synthetic images to complement real captured images, and to overcome the need for the efficient neural network architectures used in a second stage to extrapolate to those conditions. With an expanded dataset generated from DRAM$^\ell$, the second stage of our system involves training neural network architecture, DRAM$\in$, with high capacity and low compute. In some embodiments, a hyper-network produces lighting-specific network weights of a deconvolutional architecture capable of spanning the space of expressions for a single lighting condition.

In some embodiments, DRAM$\in$ includes two components, one network (a teacher network) that takes the desired lighting condition as input and predicts the weights for a second network (a student network) that produces the view, expression, and lighting-dependent texture. Such a design further increases the capacity of the network and results in renderings of much higher quality while maintaining a low computational cost. The result is a method for creating animatable faces that can be relit using novel illumination conditions and rendered in real time. Relightable models as disclosed herein may be run from a VR-headset mounted camera and rendering under novel and varying illumination conditions, in real-time.

More specifically, embodiments as disclosed herein include:

A method for generating high-fidelity animatable personalized face avatars from dynamic multi-view light-stage data that can be relit under novel lighting environments, including challenging natural illumination and near-field lighting that are far from what is observed during training.

A student-teacher framework for training an efficient relighting model that achieves real-time rendering while overcoming generalization limitations typically exhibited by such models.

A hyper-network architecture for early-conditioned models that achieves significantly improved reconstruction accuracy while remaining efficient to evaluate.

An implementation of relightable faces driven by headset mounted cameras for VR applications, in real-time.

In addition, to overcome challenges presented by dynamic capture (e.g., real time generation combined with heavy computational demand), some embodiments include conditional variational auto-encoders (CVAE) with amortized inference properties to disentangle expression from lighting. To adjust the model for novel lighting conditions that one might encounter in practice, such as indoor and outdoor illumination conditions that can be quite different from the point light patterns used during data capture, a two-stage system (teacher network and student network) enables efficient relightable models that generalize to unseen lighting conditions to be learned.

Embodiments as disclosed herein can use an arbitrary lighting direction and predict the texture under the desired lighting conditions. Embodiments as disclosed herein support the rendering of directional lighting as well as near-field lighting. For complex lighting conditions like environment maps, some embodiments predict textures for every single pixel in the environment map, and linearly combine them to synthesize a face image in that environment. The model's runtime comprises: 24 ms for shadow map calculation, 29 ms for feature map generation, and 0.9 ms for full texture decoding of a single lighting direction on a single graphics processing unit (GPU). In some embodiments, a feature map generation is computed only once, while a shadow map and texture decoding may be performed for each light in the environment. Accordingly, a single light rendering using DRAM$^\ell$ can be relatively fast (e.g., ~55 ms), and a low-resolution (16×32) environment map can take ~18 seconds.

Example System Architecture

FIG. 1 illustrates an example architecture 100 suitable for accessing a model training engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the model training engine. For purposes of load balancing, multiple servers 130 can host memories including instructions to one or more processors, and multiple servers 130 can host a history log and a database 152 including multiple training archives used for the model training engine. Moreover, in some embodiments, multiple users of client devices 110 may access the same model training engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein.

Servers 130 may include any device having an appropriate processor, memory, and communications capability for hosting the model training engine including multiple tools associated with it. The model training engine may be accessible by various clients 110 over network 150. Client devices 110 can be, for example, desktop computers, mobile computers, tablet computers (e.g., including e-book readers), mobile devices (e.g., a smartphone or PDA), or any other device having appropriate processor, memory, and communications capabilities for accessing the model training engine on one or more of servers 130. In some embodiments, a client device 110 may include a virtual reality (VR), or augmented reality (AR) headset. Accordingly, an application installed in the headset may use a 3D rendering model to create an immersive reality environment. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
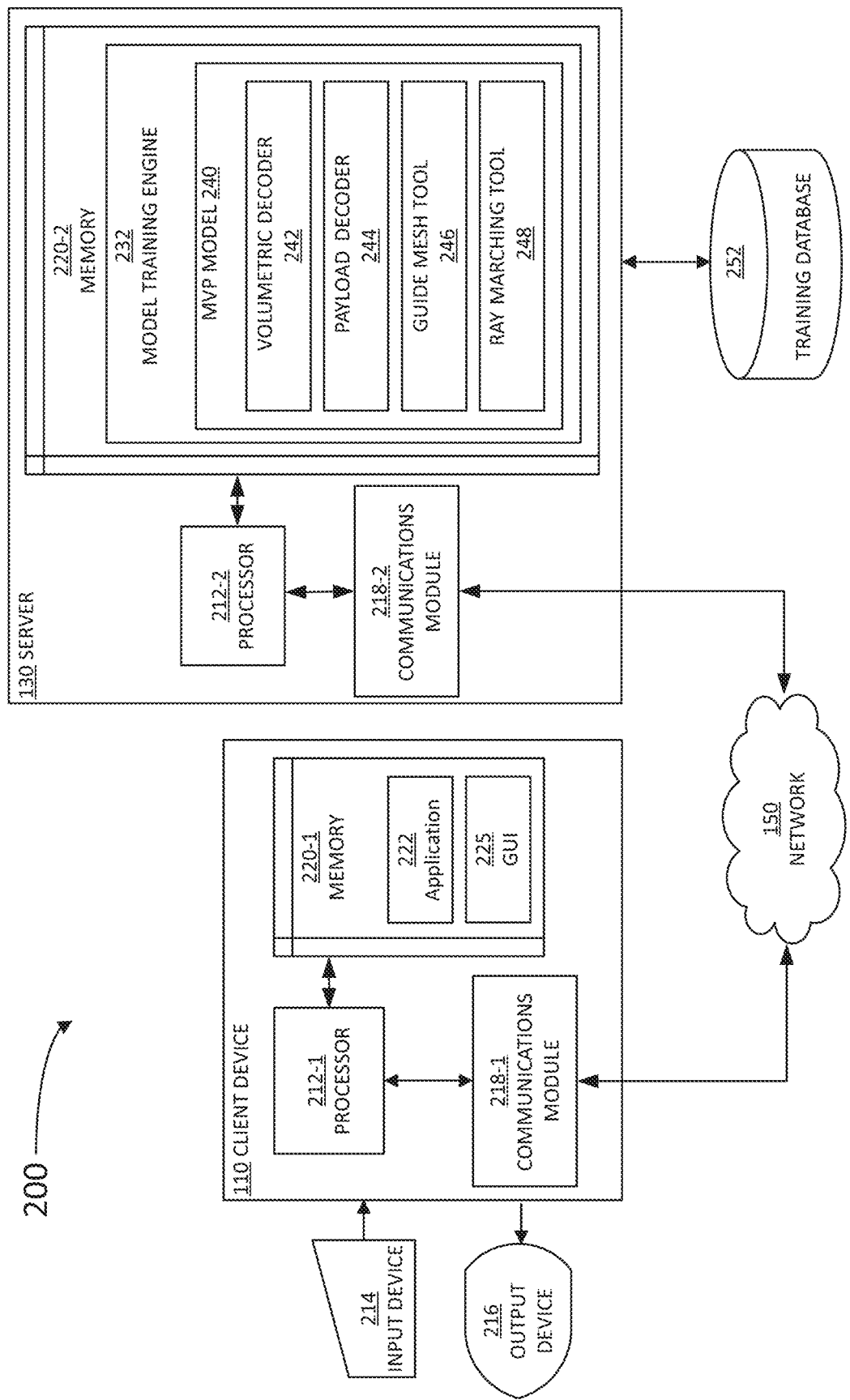
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards. Client device 110 may be a desktop computer, a mobile computer (e.g., a laptop, a palm device, a tablet, or a smart phone), or an AR/VR headset configured to provide an immersive reality experience to a user.

A user may interact with client device 110 via an input device 214 and an output device 216. Input device 214 may include a mouse, a keyboard, a pointer, a joystick, a touchscreen, a microphone, a video camera, and the like. In some embodiments, input device 214 may include a back-facing camera to capture the face of a user of a VR/AR headset, or a portion thereof, including an eye, the chin, the mouth, and even facial expressions of the user. Accordingly, in some embodiments, input device 214 may include an eye tracking device to capture the movement of a user's pupil in an AR/VR headset. Output device 216 may be a screen display (e.g., a VR/AR display), a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130, and may be hosted by server 130.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a model training engine 232. Model training engine 232 may share or provide features and resources to application 222, including multiple tools associated with training and using a three-dimensional avatar rendering model for immersive reality applications. The user may access model training engine 232 through an application installed in a memory 220-1 of client device 110. Accordingly, application 222 may be installed by server 130 and perform scripts and other routines provided by server 130 through any one of multiple tools. Execution of application 222 may be controlled by processor 212-1. In some embodiments, a GUI 225 includes an interactive display that reads inputs and outputs from a virtual joystick representing a real joystick handled by the user (input device 214).

Model training engine 232 may be configured to create, store, update, and maintain a real-time relightable appearance model 240, as disclosed herein. Relightable appearance model 240 may include encoders, decoders, and tools such as a geometry decoder 242, a texture decoder 244, an illumination tool 246, and a light power tool 248. In some embodiments, model training engine 232 may access one or more machine learning models stored in a training database 252. Training database 252 includes training archives and other data files that may be used by model training engine 232 in the training of a machine learning model, according to the input of the user through GUI 225. Moreover, in some embodiments, at least one or more training archives or machine learning models may be stored in either one of memories 220, and the user may have access to them through application 222.

Geometry decoder 242 reproduces the face geometry. Texture decoder 244 determines the color and opacity stored under a given environmental map.

Model training engine 232 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, model training engine 232 is configured to access training database 252 to retrieve documents and archives as inputs for the machine learning model. In some embodiments, model training engine 232, the tools contained therein, and at least part of training database 252 may be hosted in a different server that is accessible by server 130.

Figure 3A:
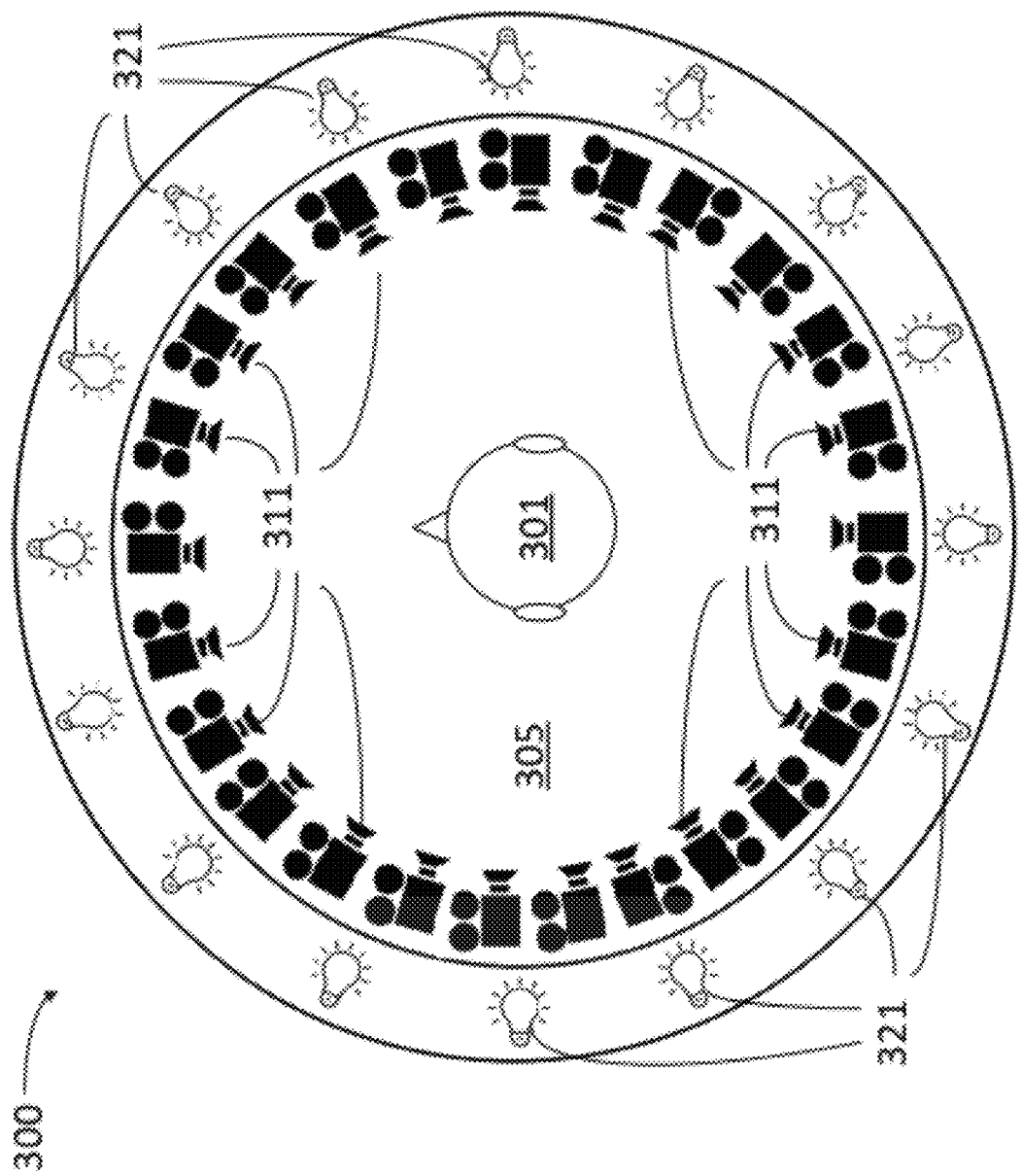
FIGS. 3A-3C illustrate a multi-camera video system and an acquisition coordinate system for an offline training of a person-specific deep appearance model, according to some embodiments.
Figure 3B:
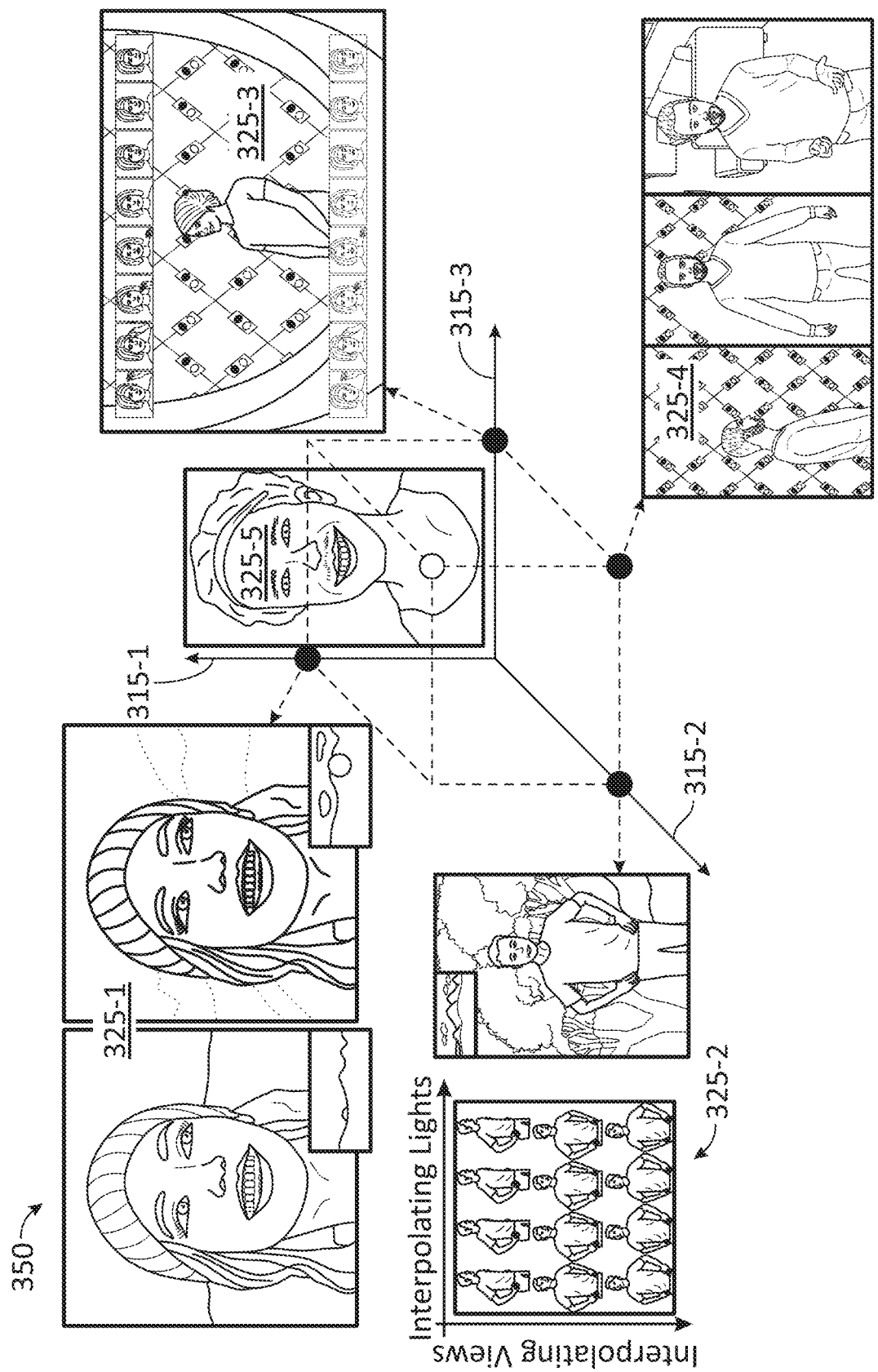

FIGS. 3A-3B illustrate a multi-camera video system 300 and an acquisition coordinate system 350 for an offline training of a person-specific deep appearance model, according to some embodiments.

Video system 300 includes multiple illumination sources 321 and video cameras 311, arranged around a subject 301. Video system 300 may also include a background scenario 305, which may be adjusted accordingly (e.g., a closed room or environment, an outdoor environment, and the like). Illumination sources 321 and video cameras 311 may surround subject 301 over 360° at multiple levels relative to the participant's head: above, below, level with the eyes, and the like. Moreover, in some embodiments, at least one or more of illumination sources 321 and/or video cameras 311 may be moving around subject 301, while a video is captured. In addition to varying intensity, illumination sources 321 may also vary the color gamut of an illumination light provided to subject 301 (e.g., white light undertones, blue undertones, red-orange undertones, and the like). Video cameras 311 may include color cameras, providing Red, Green, and Blue (RGB) pixel arrays per frame of subject 301.

In some embodiments, each subject 301 is captured by video cameras 311 performing multiple gestures (e.g., one, two, six times, or more), using multiple lighting configurations within a variety of backgrounds 305. A subject is asked to make a predefined set of facial expressions, recite a set of 50 phonetically balanced sentences, perform a range-of-motion sequence, and have a short natural conversation with a colleague. During capture, all or most of the more than one hundred cameras 311 synchronously capture at a frame rate of several frames per second (70, 90, or more), and output 8-bit Bayer-pattern color images with a resolution of 2668× 4096.

Each video capture may last a few seconds or up to several minutes (e.g., 8 or 10 minutes), during which subject 301 would show a variety of facial expressions and read aloud several sentences. In some embodiments, subject 301 simply rotates one of video cameras 311 in selected increments (e.g., 90 degrees), and modifies the lighting configuration by turning illumination sources 321 'on' or 'off' on either side of their face, for different captures. Any configuration for illumination sources 321 may be used as desired. At each frame, video system 300 collects two or more images, $\{I^0, I^1\}$, wherein each image is collected by a different video camera 311, at a different angle or perspective of subject 301.

Acquisition coordinate system 350 may include three different characteristics that are varied independently during video capture, namely: lighting conditions (315-1), multiple viewpoints (315-2), and dynamic capture of multiple expressions (315-3), hereinafter, collectively referred to as "ground-truth characteristics 315." Lighting conditions 315-1 may include multiple lighting conditions, sampled according to a predetermined pattern, to create a model 325-1. Viewpoints 315-2 may include hundreds (e.g., 140, or more) of video cameras 311 pointing to subject 301 in multiple directions (preferably covering a wide solid angle of view) to create a model 325-2. Dynamic capture of multiple expressions 315-3 include a set of predefined expressions, such as having subject 301 recite a set of fifty (50) or more phonetically balanced sentences to create a model 325-3. Embodiments as disclosed herein may include a relightable, animatable model 325-5 of a subject that combines each of ground-truth characteristics 315. A model 325-4 may combine features 315-2 and 315-3 using multiple expressions and viewpoints.

The appearance of human faces can be modeled as a function of the facial expression, viewpoint, and lighting condition. Embodiments as disclosed herein use neural networks to approximate such a function. To supervise the training of such a network, some embodiments capture image data of all possible combinations of these ground-truth characteristics 315 using a light stage. Video system 300 may include over one hundred color cameras 311 and several hundred white LED lights 321. In some embodiments, LED lights 321 can be independently controlled with adjustable lighting intensity. Cameras 311 and lights 321 may be positioned on a spherical dome with a radius of 1.1 m surrounding the captured subject.

Figure 3C:
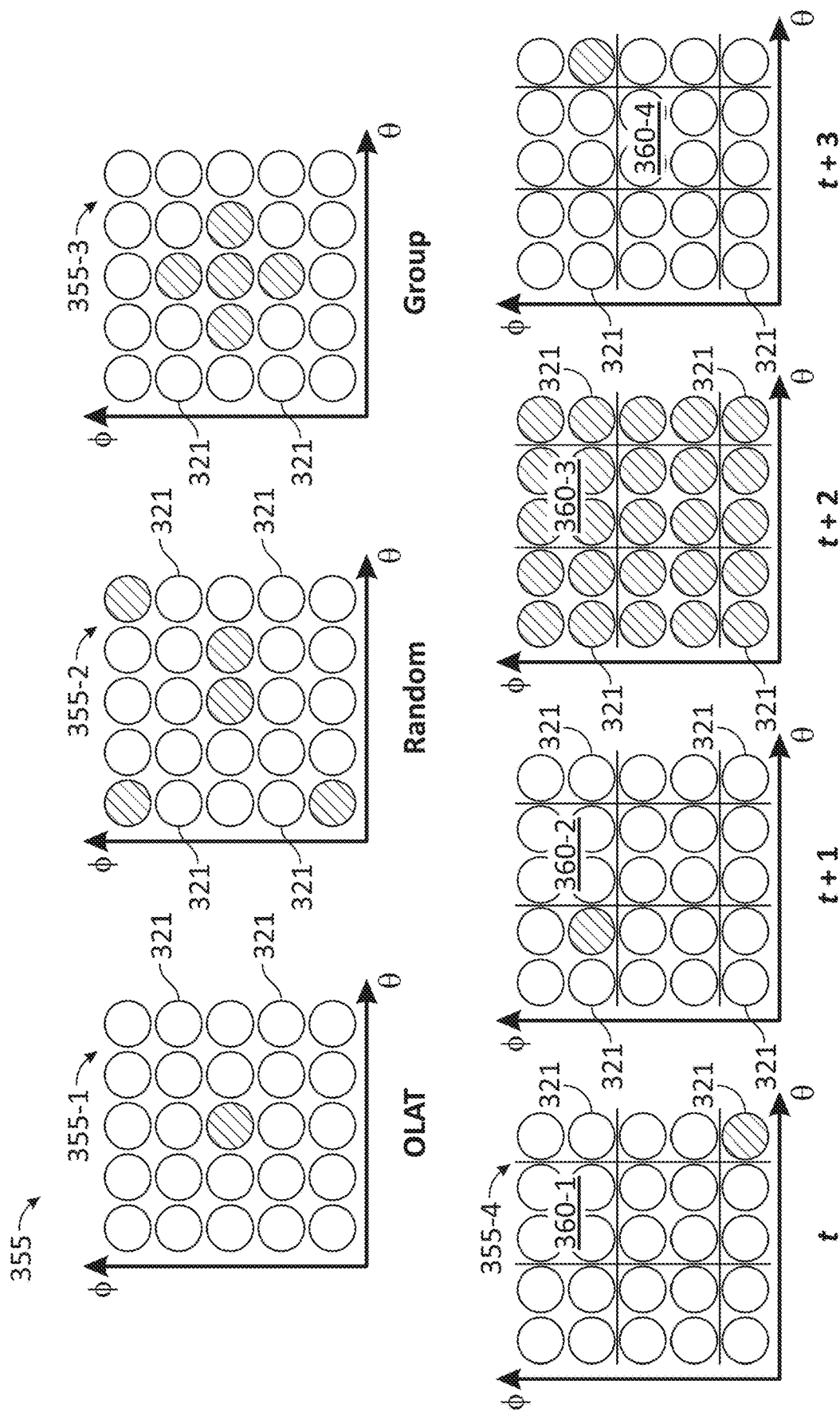

FIG. 3C illustrates a sparse set of lighting configurations 355 to densely sample expression and viewpoint combinations. The simultaneous capture of images with different lighting conditions 355-1, 355-2, 355-3, and 355-4 (hereinafter, collectively referred to as "lighting configurations 355") is achieved by dividing the lights into a grid of cells 321. While cells 321 illustrate a coarse grid, finer spatial resolution may be used, as desired. Many different facial expressions are desirably captured for each lighting configuration 355. Some embodiments include wavelength multiplexed approaches, limited in the frequency bands that can be used. Some embodiments include time-multiplexed approaches, which present challenges in capturing dynamic content with transient expressions. In some embodiments, time-multiplexed lighting is captured by rapidly cycling over a set of basis lighting patterns. However, instead of requiring static expressions for each cycle, some embodiments rely on amortized inference to disentangle lighting from expression in the captures of the face in motion, and evaluate the suitability of different kinds of lighting patterns. Some embodiments include a combination of a one light at a time (OLAT) configuration 355-1, a Random configuration 355-2 (e.g., spatially unstructured sets of 5 lights), and sets of Group patterns 355-3 (e.g., spatially clustered groups of lights in one or more sets, e.g., one with five lights and another with ten). The rank of the basis formed by each lighting pattern ranges from 460 to 50. In some embodiments, a configuration 355-4 may include a fully lit frame 360-3 interleaved after single lighting 360-4, complementary frames 360-1 and 360-2 to enable face tracking which produces a topologically consistent mesh, $M \in R^{3 \times 7306}$, for every frame. The following notation refers to the lighting configuration at a given frame:

$$L = \{b_1, b_2, \ldots, b_n\} \qquad (1)$$

where bi is the index of the i-th light that is turned on and n is the total number of lights for that frame.

The choice of lighting patterns is guided by different factors. Configuration 355-1 (OLAT) generates a complete set of lighting conditions with the finest spatial resolution, but has a long cycle time, minimizing the variety of facial expression seen in each lighting condition. Accordingly, it is desirable to see many complementary lighting conditions for each facial expression. To achieve this, configuration 355-2 temporally samples light directions using spatially stratified random sampling: lights are first stratified into 8 groups (represented as grid cells) with the next group chosen using furthest-group sampling across consecutive frames, and the light direction chosen randomly within a group. In configuration 355-4, it is preferable to have as much light as possible to overcome the noise floor of our cameras. Random and grouped lights trade off the spatial granularity of each lighting condition, but increase the light available to the cameras, potentially relaxing requirements on capture system 300.

It is desirable to include lighting configurations with as much light as possible to overcome the noise floor of the cameras. In some embodiments, lighting configurations 355 may also provide a color gradient illumination (e.g., using a 10× slow motion), and a time-multiplex lighting.

Figure 4:
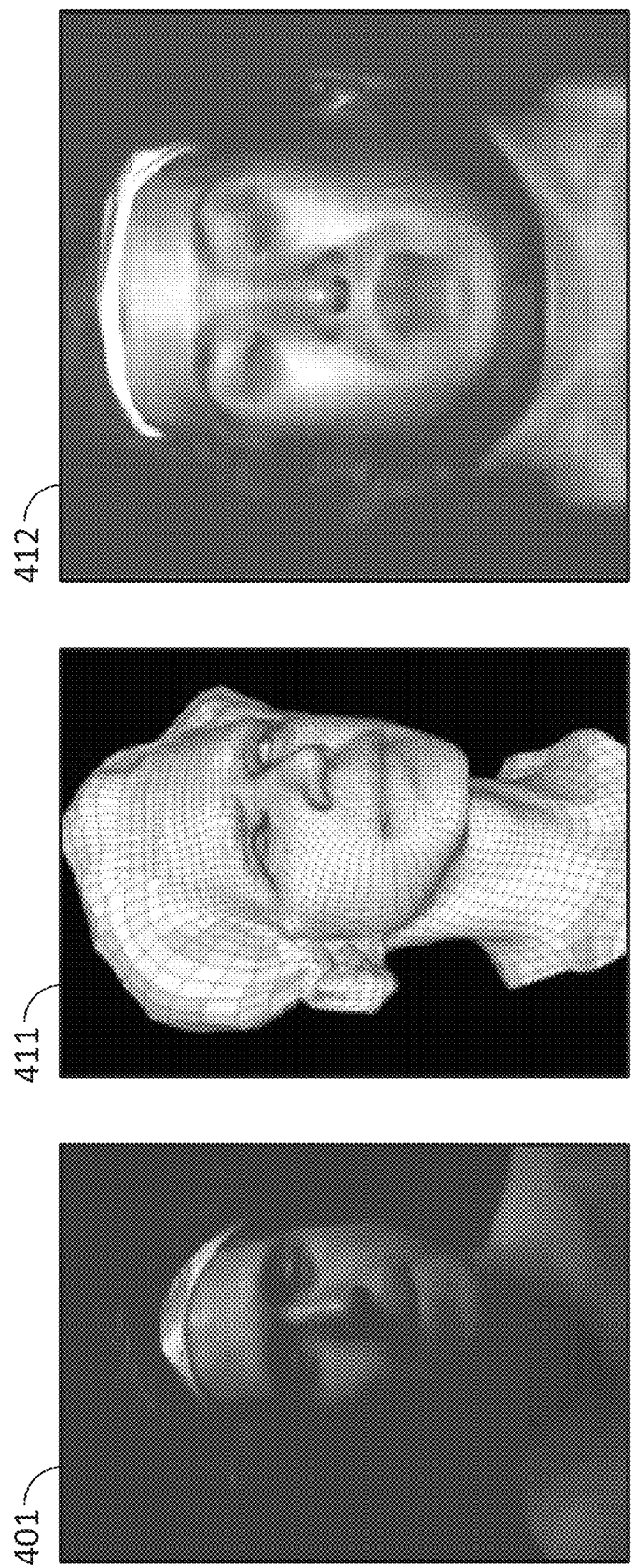
FIG. 4 illustrates a training image, a corresponding mesh, and a corresponding texture map, according to some embodiments.

FIG. 4 illustrates a training image 401 ($I \in R^{3 \times 2668 \times 4096}$) of a specific frame and camera viewpoint from a subject, whether real or synthetic. In some embodiments, image 401 is un-warped into a texture map 412 ($T \in R^{3 \times 1024 \times 1024}$), using a tracked mesh 411, for that frame (e.g., image 401). Image 401 may include one of thousands of images collected (e.g., 30000 frames of size 2668×4096 pixels). In some embodiments, texture map 412 may include two-dimensional sets of thousands of pixels (e.g., 1024×1024). In some embodiments, tracked mesh 411 may include several thousand vertices (e.g., 7306 vertices).

Figure 5:
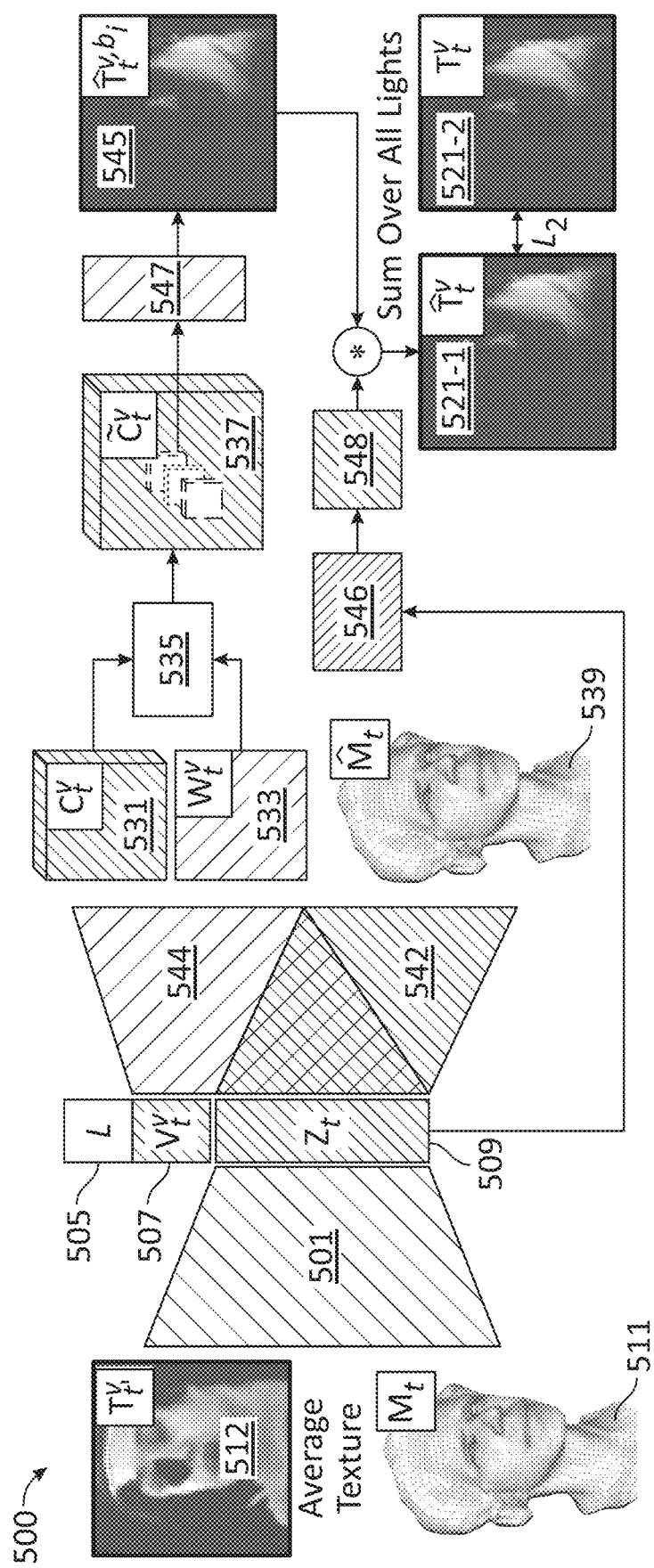
FIG. 5 illustrates a variational autoencoder to generate a relightable avatar, according to some embodiments.

FIG. 5 illustrates a variational autoencoder 500 to generate a relightable avatars 521-1 and 521-2 (hereinafter, collectively referred to as "relightable avatars 521"), according to some embodiments. In some embodiments, autoencoder 500 may be a DRAM $\ell$ that synthesizes high fidelity face images under lighting conditions that may be vastly different from what can be captured in a multi-camera video system during training (cf. multi-camera video system 300). In some embodiments, relightable avatar 521 may attain real-time performance of 75 frames per second, and is suitable for animation from headset-mounted cameras. From a texture field (cf. T 411) and a tracked mesh 511 ($M_t$), autoencoder 500 determines an average texture 512 ($\bar{T}$), for fully-lit frames by averaging the texture at each camera, which is used as input to CVAE 501 ($\varepsilon_f(M, \bar{T})$) to encourage better disentanglement between a viewpoint 507 of the camera relative to the head orientation in that frame, and a latent vector 509. CVAE 501 outputs the parameters of a variational distribution, N, from which the laten vector $z \in R^{256}$ is sampled:

$$\mu, \sigma \leftarrow (\varepsilon_f(M, \bar{T})), z \sim N(\mu, \sigma^2) \qquad (2)$$

In some embodiments, a Gaussian distribution with average, μ, and diagonal covariance $\sigma^2$ is used for N. This reparameterization ensures differentiability of the sampling process. A decoder 502 (D$\ell$) receives latent vector 509, view direction 507, and a lighting condition 505 (L) transformed to a head coordinate system. In some embodiments, decoder 502 includes a geometry branch 542 G$\ell$, which takes latent vector 509 as input and finds a predicted mesh 539 ($\hat{M}$), and a texture branch 544 (T T$_\ell$), which additionally conditions on viewpoint 507 and lighting 505 to produce texture 545 ($\hat{T}$, "texel"):

$$\hat{M} = \mathcal{G}_l(z), \hat{T} = T_l(z, v, L) \qquad (3)$$

Texture branch 544 includes a feature network 531, a warping network 533, and an OLAT network 547 (cf. OLAT configuration 355-1) to obtain texels 545. Feature network 531 produces view-dependent feature maps, C, $$C = \mathcal{F}_{(z,v)} \tag{4}$$

In some embodiments, view-dependent feature maps C may include a 64-channel of size $\in R^{512 \times 512}$. Feature maps, C, serve as a spatially varying encoding of expression and viewpoint across multiple lighting conditions. Warping network 533 outputs a view-dependent warping field, $W \in R^{2 \times 1024 \times 1024}$, which is applied to the feature map, C, resulting in a warped feature map 537, $\tilde{C}_t \in R^{64 \times 1024 \times 1024}$, of the same size as the texture:

$$W = W(z,v), \tilde{C}_t = \phi(C, W) \tag{5}$$

where ϕ denotes a warping operator 535. In some embodiments, warping operator 535 performs a bilinear interpolation at floating point coordinates. Warping field, W, accounts for texture sliding as a result of view-dependent effects stemming from imperfect geometry, most noticeable around the mouth, eyes, and hair, where accurate geometry is difficult to estimate during mesh tracking. In some embodiments, warping field, W, is also used to upscale the lower resolution feature maps, whose size is constrained by memory limitations on GPU hardware.

Given warped feature map 537 (cf. Eq. 5), OLAT network 547 predicts the color of each texel 545 under a given lighting direction. In some embodiments, OLAT network 547 is a multi-layer perceptron (MLP) that calculates the lighting direction of each texel 545 (k) using a light position, $l_{bi}$, for a light $b_i$ and the corresponding position of texel 545 on predicted mesh 539 ($\hat{M}$). One of the most distinctive appearance change on faces is shadow by self-occlusion. D ℓ decoder 502 is able to learn an appearance change in a localized manner. Furthermore, to avoid artifacts arising from shadow boundaries and a possible lack of geometric information, predicted mesh 539 ($\hat{M}$) may encode geometric relationship between light source 505 and texel 545 as a shadow map input to OLAT network 547. Specifically, OLAT network 547 calculates the difference between the depth of texel 545 and a nearest occluding object along a light ray to form predicted texture 521-1.

$$\hat{T}^{bi}(k) = \sigma(\tilde{C}_k, d^{bi}_k, s^{bi}_k) \tag{6}$$

where $d^{bi}_k$ is the lighting direction of light bi for texel 545 (k), and $s^{bi}_k$ is the depth difference. An illumination tool 546 (P) combines latent vector 509 with warped texture maps 545 to output a predicted texture 521-1 that may be compared with a ground-truth texture 521-2. Illumination tool 546 compensates for the power of each light using a light power network 548, therefore the lighting intensity of each light is calibrated into the model using weights, $\gamma^{bi}$. Each frame of training data is captured under multiple lights, and autoencoder 500 approximates the training textures by the weighted sum of textures generated for each light independently, that reflect the intensity of each light, a predicted texture 521-1 is constructed as follows:

$$\hat{T} = \sum_{i=1}^{n} \gamma^{bi} \cdot \hat{T}^{bi} \tag{7}$$

For training autoencoder 500, a loss function, L, may include a texture reconstruction loss $\ell_T$, a geometry reconstruction loss $\ell_M$, a regularizer loss on the warping field $\ell_W$ and a latent space regularizer $\ell_Z$:

$$\mathcal{L}(\mathcal{E}_l, D_l) = \sum_{v,t} \lambda_T l_T + \lambda_M l_M + \lambda_W l_W + \lambda_Z l_Z \tag{8}$$

where (v, t) are the camera and frame indices over the dataset, and:

$$l_T = \|w \odot (T - \hat{T})\|_2^2 \tag{9}$$

$$l_M = \|M - \hat{M}\|_2^2 \tag{10}$$

$$l_W = \|W - W_I\|_2^2 \tag{11}$$

$$l_Z = KL(N(\mu, \sigma) \| N(0, I)) \tag{12}$$

Wherein w is a weight map that avoids penalizing self-occluded texels 545. The term $W_I$ is an identity warping field, and the regularizer loss $\ell_W$ prevents the warped texel positions 545 from drifting too far from their original positions. The KL-divergence loss $\ell_Z$ with a standard normalization encourages a smooth latent space. In some embodiments, the weights of each loss term may be defined, without limitation, as $\lambda_T = 1$, $\lambda_M = 0.1$, $\lambda_W = 10$, $\lambda_Z = 0.001$. Some embodiments may include an Adam optimizer with a learning rate of 0.0005 for training. Autoencoder 500 may be trained with a batch size of 16 for about 300k iterations.

Figure 6:
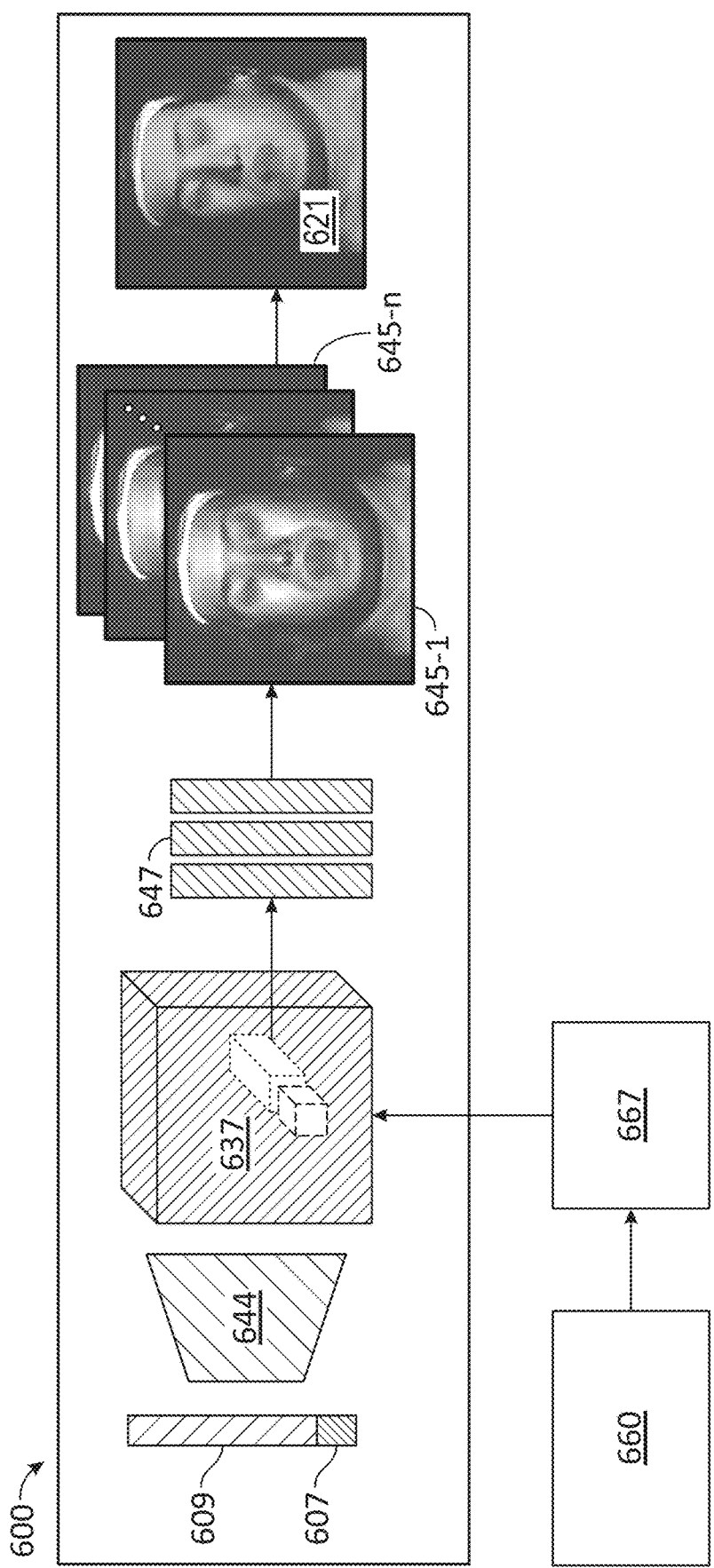
FIG. 6 illustrates a teacher network for generating a relightable avatar of a subject, according to some embodiments.

FIG. 6 illustrates a teacher network 600 for generating a group-light texture 621, according to some embodiments. A relightable avatar can be extracted from group light texture 621 by selecting a given lighting configuration or environment. A feature decoder (e.g., early conditioned decoder, D∈) 644 takes a latent vector 609 and a view direction 607 as inputs. Weights network 667 (H) provides weight for each texels 645-1 through 645-n (hereinafter, collectively referred to as "texels 645") from an environment map 660, to warped feature map 637. MLP 647 provides texels 645 from the warped textures provided by warped feature map 637. In some embodiments, texels 645 may have dimensions 1024×1024×64.

In some embodiments, feature decoder 644 may include a geometry decoder, G∈ (cf. $G^\ell$ 542), and a texture decoder, T∈ (cf. texture decoder 544), that predicts a texture under the given environmental map 660. Weights network 667 (H) may be defined by a view vector, v, lighting and expression dependent texture (z), as follows:

$$\Theta \leftarrow \mathcal{H}_{(e)}, \hat{T}^v = T_{\in}(z, v | \Theta) \tag{13}$$

Θ denotes the weights of T∈ and may include eight (8) or more transposed convolution layers. For each layer, a small weights network may include five (5) fully connected layers to predict the convolutional kernel weights and biases, similar to a late-conditioned decoder (cf. $D_l$ 502). In some embodiments, weights network 667 is a hyper-network architecture that specializes the texture decoder to a specific lighting condition, which we find to be effective in improving reconstruction performance without substantially increasing computational cost. For about 300k iterations, teacher network 600 can be trained within 3-4 days on average and can synthesize face images lit by environment maps within 13 ms (~75 frames per second), making it suitable for interactive applications, including demanding real-time applications such as VR.

Figure 7:
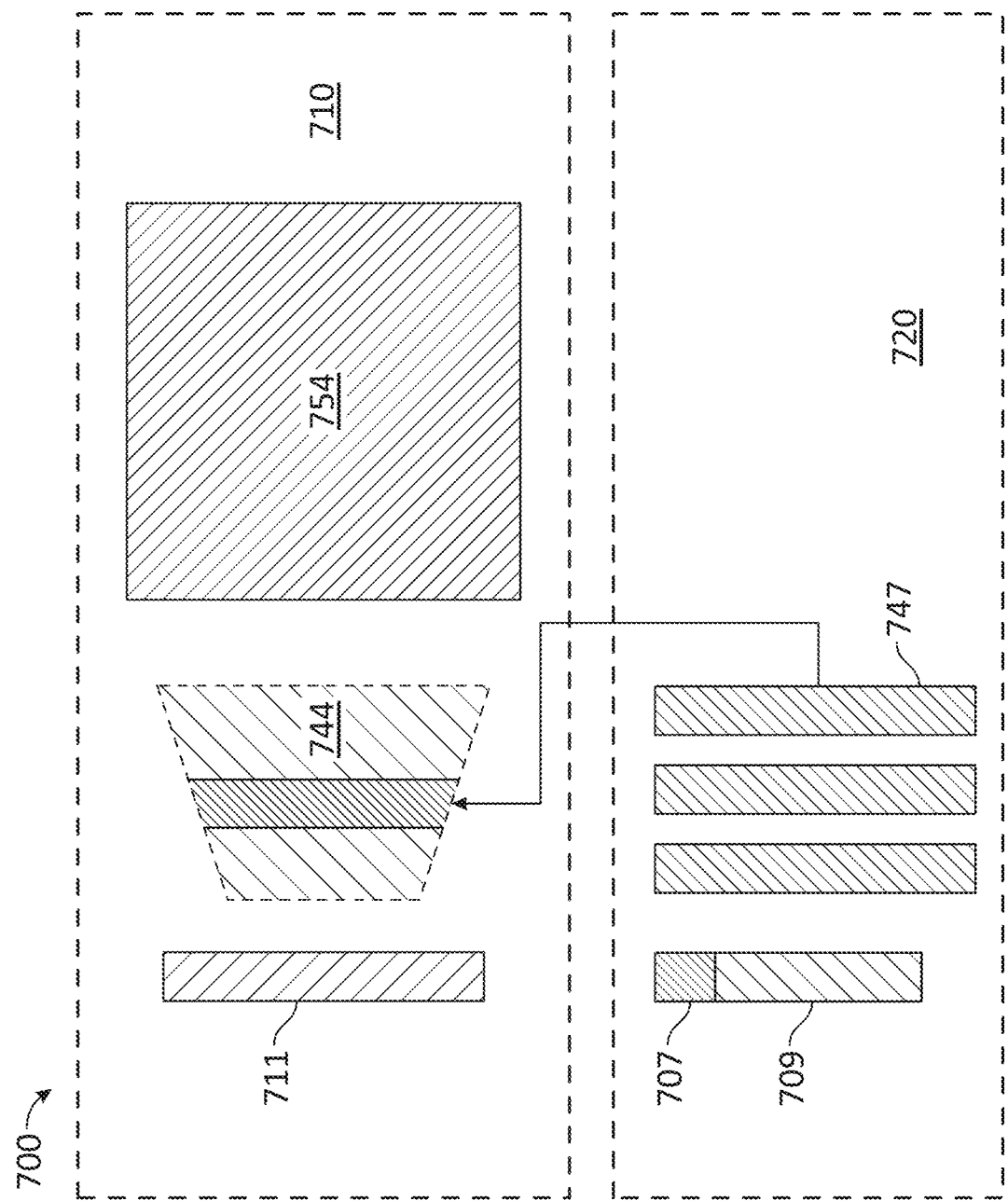
FIG. 7 illustrates a student network for generating a relightable avatar of a subject, according to some embodiments.

FIG. 7 illustrates a student network 700 for generating a relightable avatar of a subject, according to some embodiments. A texture branch 710 includes a decoder 744 operating on a geo-encoding 711. A lighting branch 720 includes MLP 747, which operates on a view direction 707 and a latent vector 709. Texture branch 710 produces multiple textures 754 associated with different lighting conditions, as learned with lighting branch 720.

Figure 8:
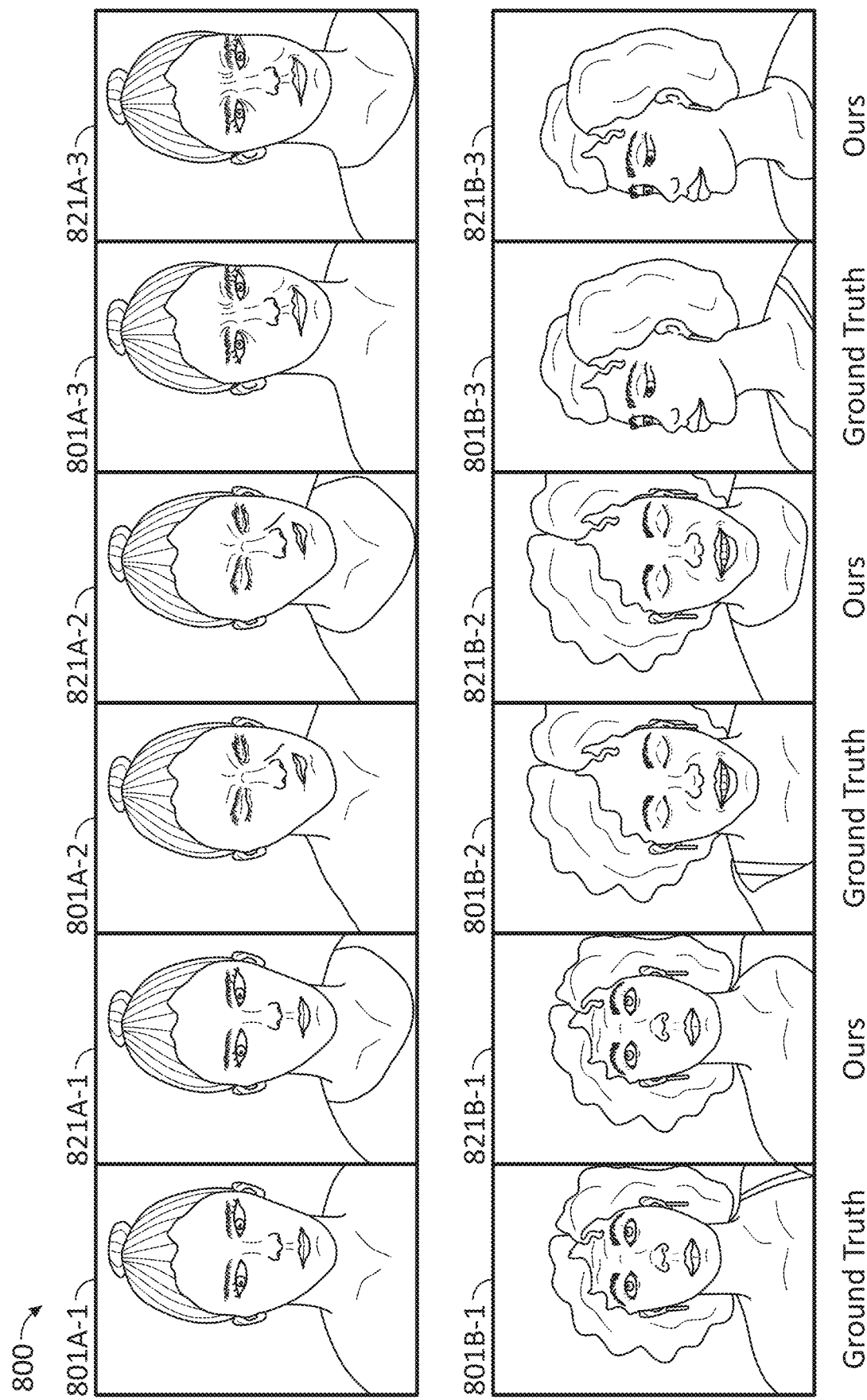
FIG. 8 illustrates a comparison between ground-truth images and relightable avatars under different viewpoints and expressions, for two subjects, according to some embodiments.

FIG. 8 illustrates a comparison between ground-truth images 801A-1, 801A-2, 801A-3, 801B-1, 801B-2, and 801B-3 (hereinafter, collectively referred to as "ground-truth images 801A, 801B, and 801," respectively) and relightable avatars 821A-1, 821A-2, 821A-3, 821B-1, 821B-2, and 821B-3 (hereinafter, collectively referred to as "relightable avatars 821A, 821B, and 821," respectively) under different viewpoints and expressions −1, −2, −3, for two subjects A and B, according to some embodiments.

Ground truth images 801A include 18014 and 34432 frames, and ground truth images 801B include 17165 and 23072 frames. All numbers are reported on the first sequence except for those in Table 1. Table 1 includes image-space error metrics such as mean-squared error (MSE) and structural similarity index (SSIM). In some embodiments, ground truth OLAT images may have different lighting intensity than the model predictions, and there are potential color mismatches due to different camera calibrations. A matrix $Q \in R^{3 \times 3}$ may be used to align relightable avatars 821, $\hat{I}$, to ground truth images 801, as follows:

$$Q = \underset{Q}{\mathrm{argmin}} \| Q\hat{I} - I \|_2^2 \qquad (14)$$

Table 1 includes error metrics between Q $\hat{I}$ and I. In Table 2, we perform an ablation study to show the effectiveness of applying depth differences as input to the OLAT network, illustrating that depth differences correctly predicts accurate shadows.

TABLE 1

|  | Subject 1 | | Subject 2 | |
| --- | --- | --- | --- | --- |
|  | MSE (×10⁻⁴) | SSIM | MSE (×10⁻⁴) | SSIM |
| OLAT | 6.7205 | 0.9843 | 3.866 | 0.9931 |
| Random | 6.7588 | 0.9840 | 4.124 | 0.9930 |
| Group-5 | 6.5536 | 0.9842 | 3.676 | 0.9933 |

TABLE 2

|  | Subject 1 | | Subject 2 | |
| --- | --- | --- | --- | --- |
|  | MSE (×10⁻⁴) | SSIM | MSE (×10⁻⁴) | SSIM |
| Our full model | 6.4377 | 0.9363 | 2.9843 | 0.9469 |
| w/o depth difference | 6.5115 | 0.9344 | 3.0562 | 0.9464 |

A student network includes a texture branch 710 and a lighting branch 720. Lighting branch 720 uses a view direction and color layers to provide convolution weights and bias to texture branch 710.

Figure 9:
FIG. 9 illustrates a relightable avatar of a subject in a nearfield lighting configuration, a directional lighting configuration, and an environmental lighting configuration from a teacher network, according to some embodiments.

FIG. 9 illustrates relightable avatars 921A, 921B, and 921C (hereinafter, collectively referred to as "relightable avatars 921") of a subject in a nearfield lighting configuration 946-1, a directional lighting configuration 946-2, and an environmental lighting configuration (946-3), respectively, hereinafter, collectively referred to as "lighting configurations 946" from a teacher network 900, according to some embodiments. In some embodiments, it is desirable that lighting configurations 946 include shadows, specularities, and detailed gleans.

Figure 10A:
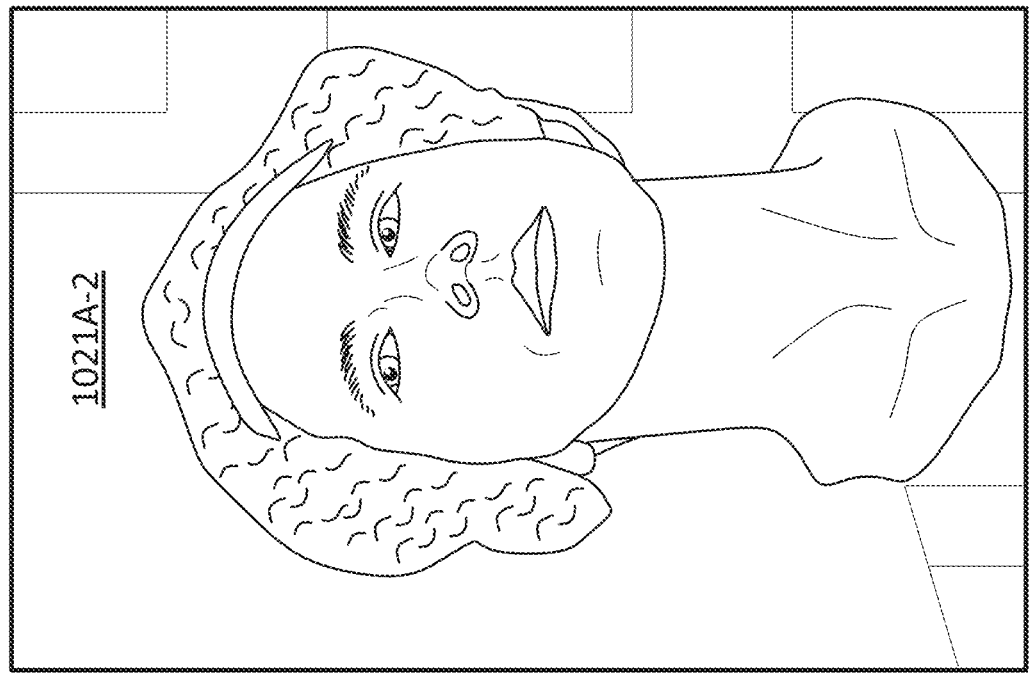
FIGS. 10A-10B illustrate relightable avatars of subjects and indoor/outdoor environments from a student network, according to some embodiments.
Figure 10A:
Figure 10B:
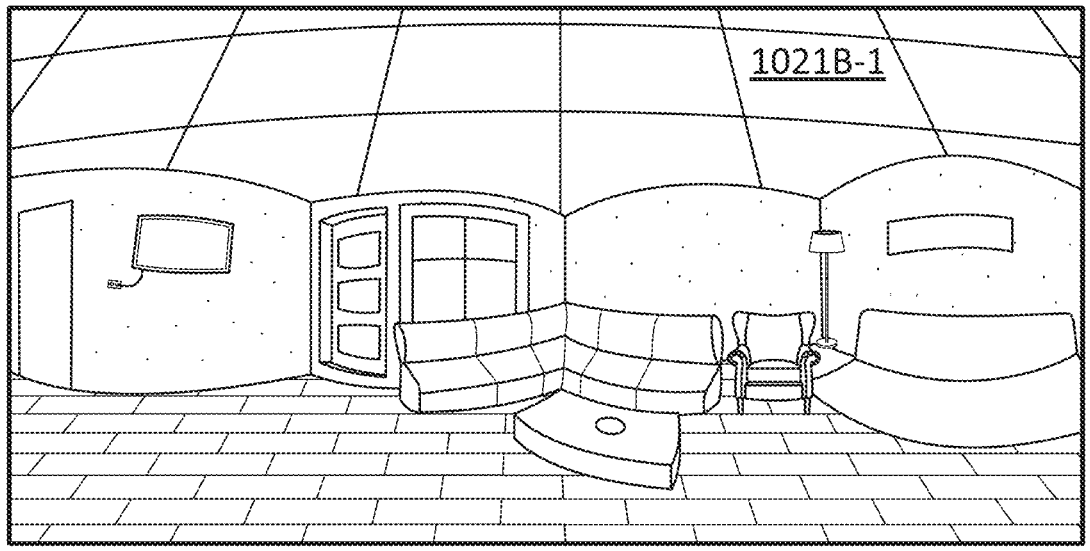
Figure 10B:
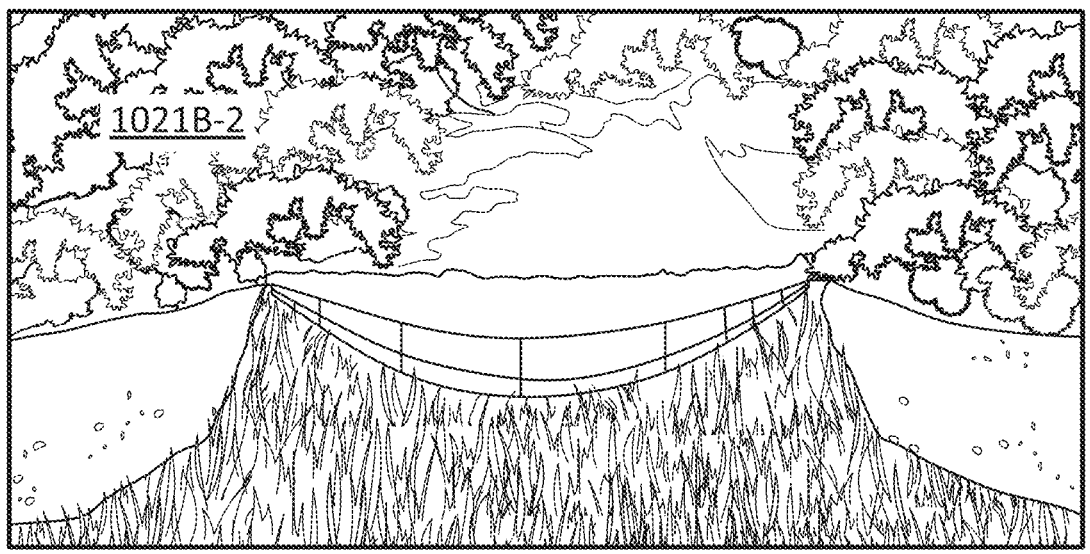

FIGS. 10A-10B illustrate relightable avatars 1021A-1 and 1021A-2 of subjects (hereinafter, collectively referred to as "subject avatars 1021A") and indoor/outdoor environment maps 1021B-1 and 1021B-2, respectively (hereinafter, collectively referred to as "environment maps 1021B") from a student network, according to some embodiments.

In some embodiments, environment maps 1021B may include a dataset with 2560 maps for training and 534 for testing. In total, 1.2 million to 1.8 million training images may be used.

Figure 11:
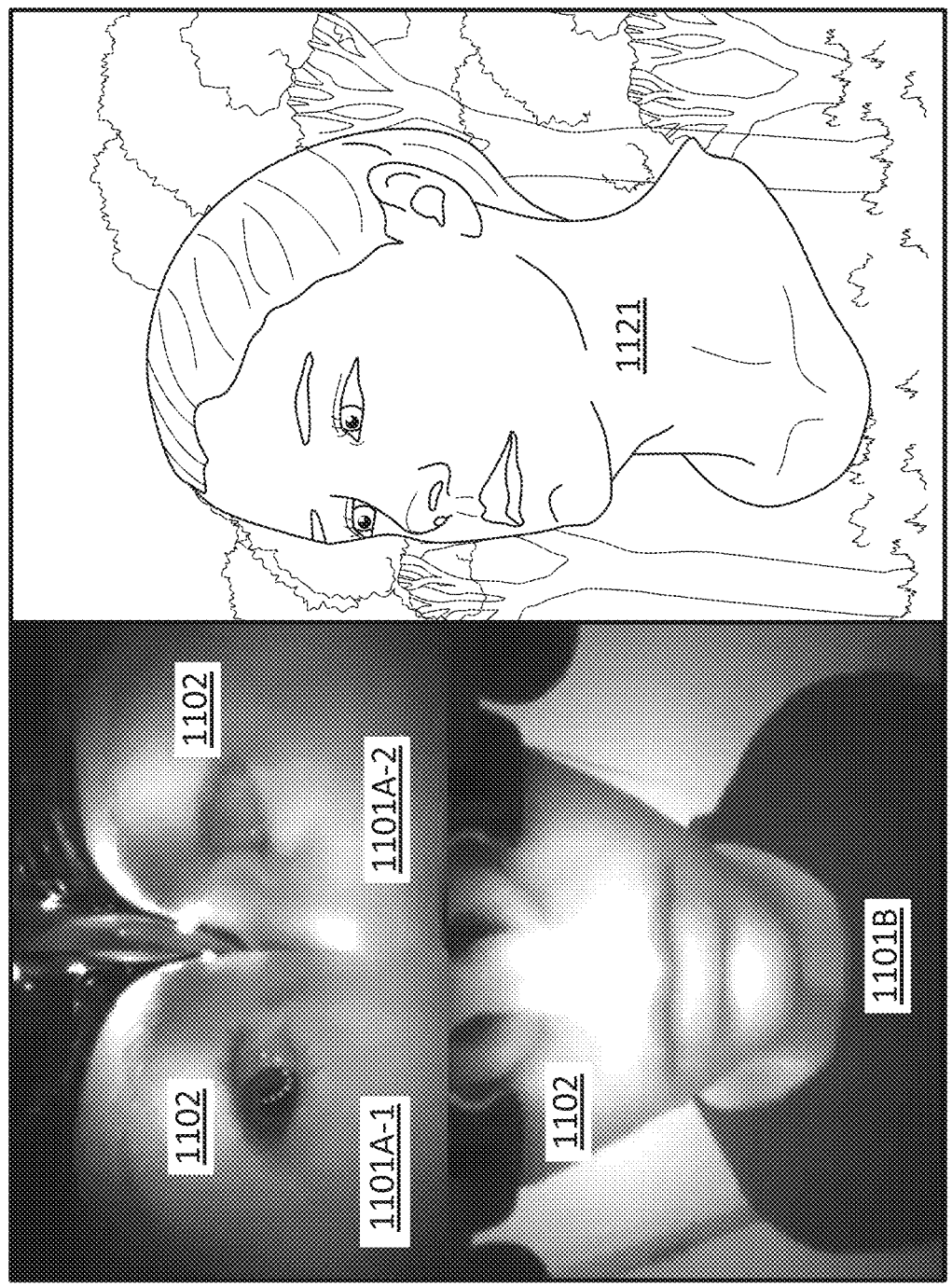
FIG. 11 illustrates a relightable, animatable avatar for use with a VR/AR headset in an immersive reality application, according to some embodiments.

FIG. 11 illustrates a relightable, animatable avatar 1121 for use with a VR/AR headset in an immersive reality application, according to some embodiments. Accordingly, relightable, animatable avatar 1121 is generated from a decoder encoder model as disclosed herein, using as inputs images 1101A-1 and 1101A-2 (hereinafter, collectively referred to as "side views 1101A") and 1101B providing multiple views of a subject 1102. Subject 1102 may be a user of the VR/AR headset, and images 1101A and 1101B may be captured from multiple cameras mounted inside/outside of the VR/AR headset, facing different portions of subject 1102.

Figure 12:
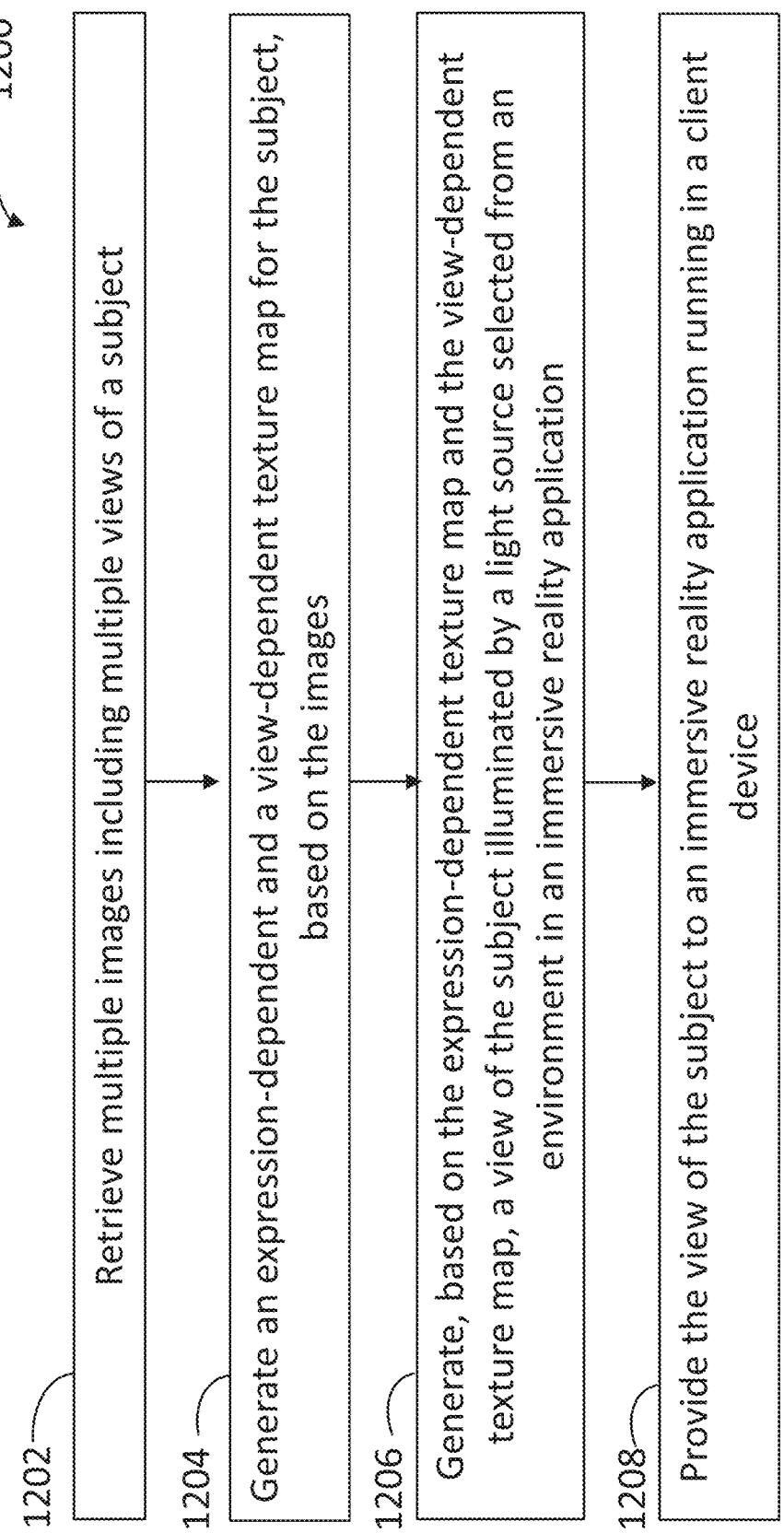
FIG. 12 is a flow chart illustrating steps in a method for embedding a real-time, clothed subject animation in a virtual reality environment, according to some embodiments.

FIG. 12 is a flow chart illustrating steps in a method 1200 for embedding a real-time, clothed subject animation in a virtual reality environment, according to some embodiments. In some embodiments, method 1200 may be performed at least partially by a processor executing instructions in a client device or server as disclosed herein (cf. processors 212 and memories 220, client devices 110, and servers 130). In some embodiments, at least one or more of the steps in method 1200 may be performed by an application installed in a VR/AR headset, or a model training engine including a relightable appearance model (e.g., application 222, model training engine 232, and relightable appearance model 240). A user may interact with the application in the client device via input and output elements and a GUI, as disclosed herein (cf. input device 214, output device 216, and GUI 225). The relightable appearance model may include a geometry decoder, a texture decoder, an illumination tool, and a light power tool, as disclosed herein (e.g., geometry decoder 242, texture decoder 244, illumination tool 246, and light power tool 248). In some embodiments, methods consistent with the present disclosure may include at least one or more steps in method 1200 performed in a different order, simultaneously, quasi-simultaneously, or overlapping in time.

Step 1202 includes retrieving multiple images including multiple views of a subject. In some embodiments, step 1202 includes performing a time-multiplexing lighting of the subject, cycling lighting conditions over a set of basic lighting patterns while the subject performs expression shifts in real-time. Step 1202 may include collecting about ninety (90) frames per second. In some embodiments, step 1202 includes retrieving one or more frames from one or more headset mounted cameras facing a user of a virtual reality headset.

Step 1204 includes generating an expression-dependent texture map and a view-dependent texture map for the subject, based on the images. In some embodiments, step 1204 includes selecting a lighting configuration for the immersive reality application. In some embodiments, step 1204 includes determining a lighting configuration based on an environment map including multiple lighting configurations in an environment for the subject in the immersive reality application. In some embodiments, step 1204 includes determining a geolocation of an environment of the subject in the immersive reality application, a subject orientation in the environment, and a view direction. In some embodiments, step 1204 includes interpolating a lighting configuration based on a first lighting configuration and a second lighting configuration available in the expression-dependent texture map and the view-dependent texture map. In some embodiments, step 1204 includes retrieving a shadow map to encode a geometric association between a light source in the immersive reality application and the view-dependent texture map. In some embodiments, step 1204 includes linearly combining multiple expression-dependent texture maps based on a lighting condition of the expression-dependent texture maps.

Step 1206 includes generating, based on the expression-dependent texture map and the view-dependent texture map, a view of the subject illuminated by a light source selected from an environment in an immersive reality application. In some embodiments, step 1206 includes identifying a clear shadow boundary from a self-occlusion from a portion of a face of the subject.

Step 1208 includes providing the view of the subject to an immersive reality application running in the client device. In some embodiments, step 1208 includes providing a video of the subject based on animated views of the subject in the immersive reality application.

Figure 13:
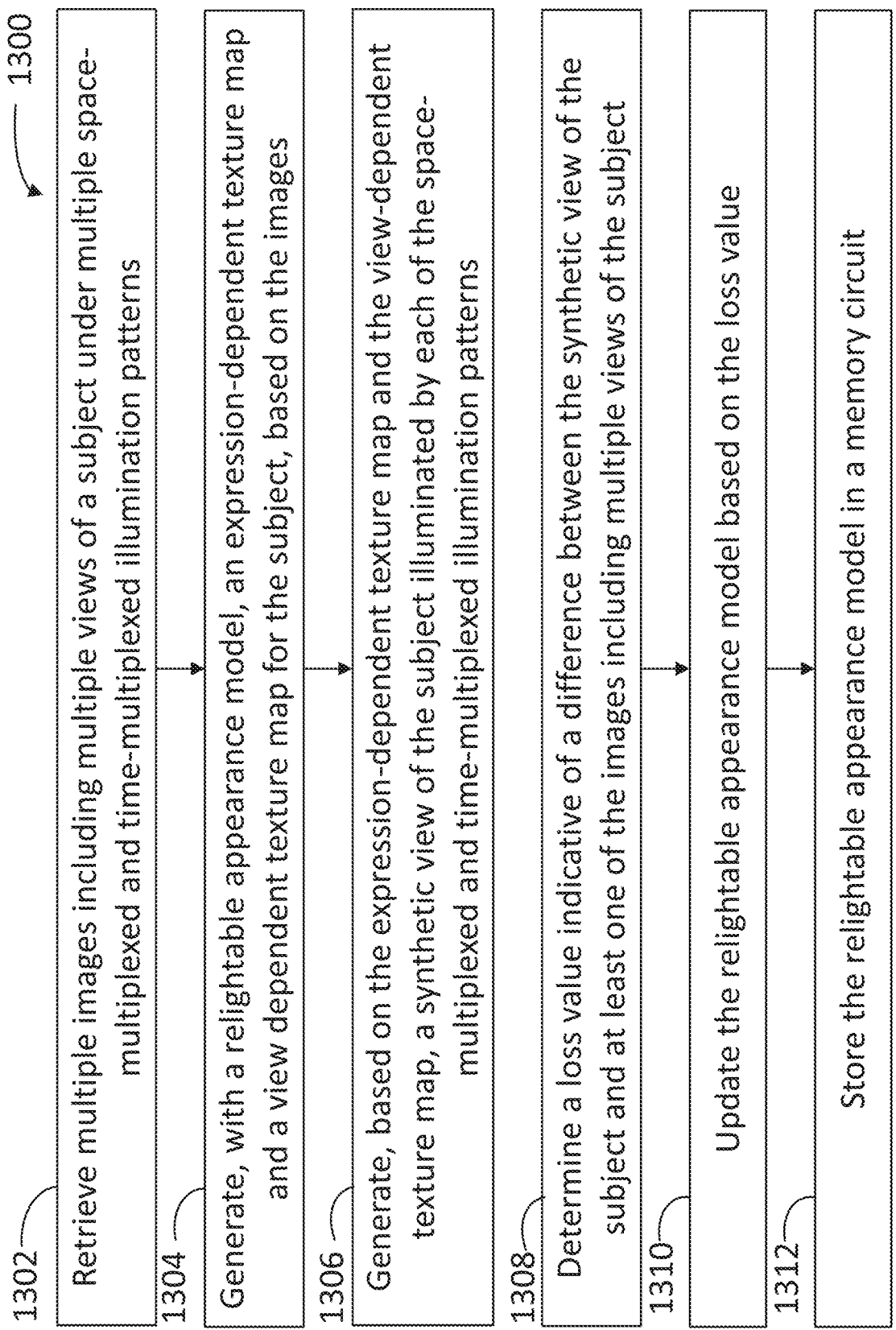
FIG. 13 illustrates a flowchart with steps in a method for rendering a three-dimensional model of a subject from a video capture in an immersive reality application, according to some embodiments.

FIG. 13 is a flow chart illustrating steps in a method 1300 for embedding a real-time, clothed subject animation in a virtual reality environment, according to some embodiments. In some embodiments, method 1300 may be performed at least partially by a processor executing instructions in a client device or server as disclosed herein (cf. processors 212 and memories 220, client devices 110, and servers 130). In some embodiments, at least one or more of the steps in method 1300 may be performed by an application installed in a VR/AR headset, or a model training engine including a relightable appearance model (e.g., application 222, model training engine 232, and relightable appearance model 240). A user may interact with the application in the client device via input and output elements and a GUI, as disclosed herein (cf. input device 214, output device 216, and GUI 225). The relightable appearance model may include a geometry decoder, a texture decoder, an illumination tool, and a light power tool, as disclosed herein (e.g., geometry decoder 242, texture decoder 244, illumination tool 246, and light power tool 248). In some embodiments, methods consistent with the present disclosure may include at least one or more steps in method 1300 performed in a different order, simultaneously, quasi-simultaneously, or overlapping in time.

Step 1302 includes retrieving multiple images including multiple views of a subject under multiple space-multiplexed and time-multiplexed illumination patterns. In some embodiments, step 1302 includes configuring an array of light emitters in a one light at a time illumination pattern. In some embodiments, step 1302 includes selecting a time-multiplexed pattern of lighting configurations such as complementary lighting configurations, a fully-lit lighting configuration, and a single light lighting configuration.

Step 1304 includes generating, with a relightable appearance model, an expression-dependent texture map and a view-dependent texture map for the subject, based on the images. In some embodiments, step 1304 includes generating pixelated frames having a color value and an opacity value for each of multiple expressions and multiple view directions of the subject from the images. In some embodiments, step 1304 includes generating a shadow map that associates each light in an environment of the subject with a view direction and an occlusion along the view direction.

Step 1306 includes generating, based on the expression-dependent texture map and the view-dependent texture map, a synthetic view of the subject illuminated by each of the space-multiplexed and time-multiplexed illumination patterns.

Step 1308 includes determining a loss value indicative of a difference between the synthetic view of the subject and at least one of the images including multiple views of the subject.

Step 1310 includes updating the relightable appearance model based on the loss value.

Step 1312 includes storing the relightable appearance model in a memory circuit. In some embodiments, step 1312 includes providing the relightable, three-dimensional representation of the subject to a client device for an immersive reality application.

Hardware Overview

Figure 14:
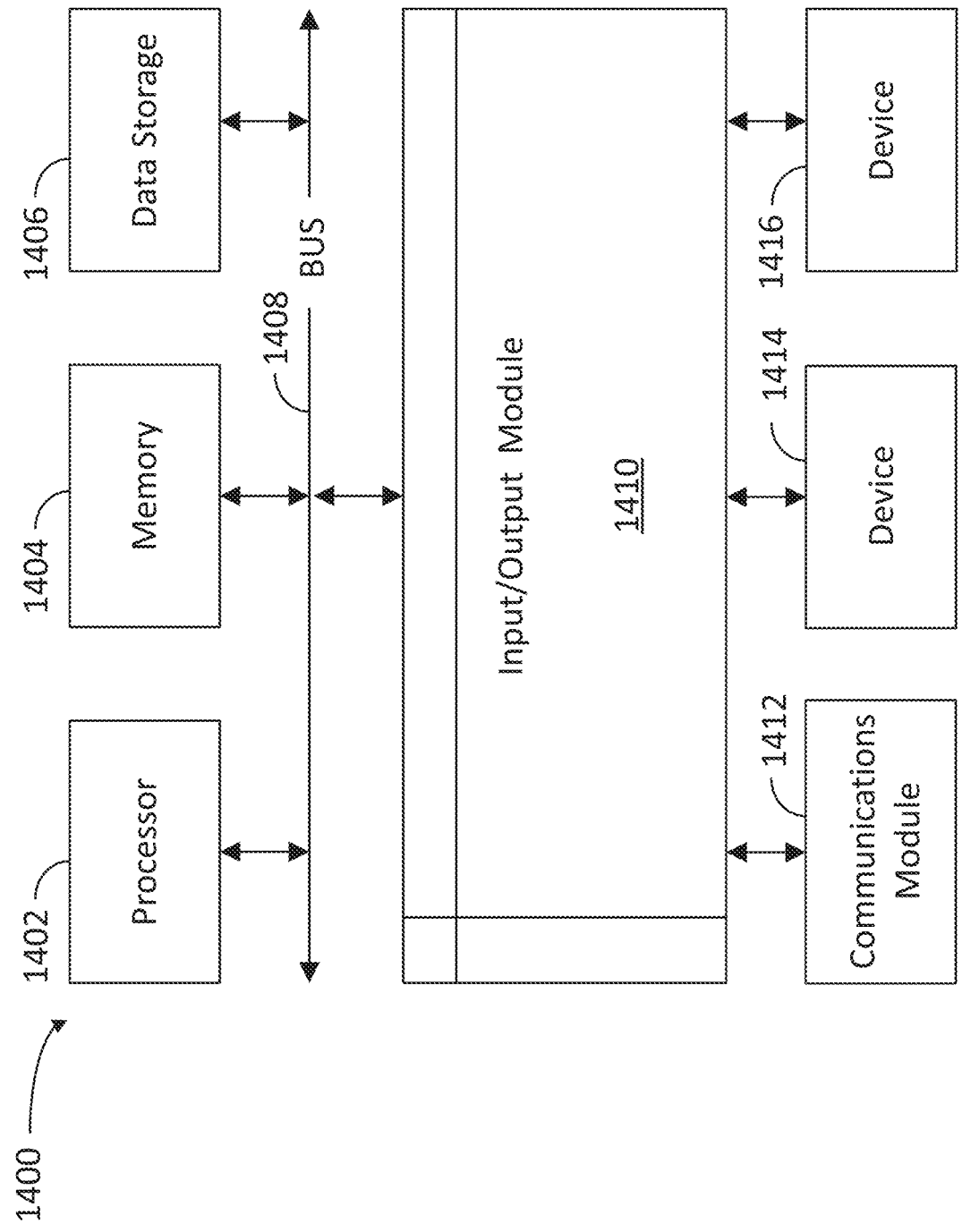
FIG. 14 is a block diagram illustrating an example computer system with which the client and server of FIGS. 1 and 2 and the methods of FIGS. 12-13 can be implemented.

FIG. 14 is a block diagram illustrating an exemplary computer system 1400 with which the client and server of FIGS. 1 and 2, and the methods of FIGS. 12 and 13 can be implemented. In certain aspects, the computer system 1400 may be implemented using hardware or a combination of software and hardware, either in a dedicated server, or integrated into another entity, or distributed across multiple entities.

Computer system 1400 (e.g., client 110 and server 130) includes a bus 1408 or other communication mechanism for communicating information, and a processor 1402 (e.g., processors 212) coupled with bus 1408 for processing information. By way of example, the computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory 1404 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry.

The instructions may be stored in the memory 1404 and implemented in one or more computer program products, e.g., one or more modules of computer program instructions encoded on a computer-readable medium for execution by, or to control the operation of, the computer system 1400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices. Input/output module 1410 can be any input/output module. Exemplary input/output modules 1410 include data ports such as USB ports. The input/output module 1410 is configured to connect to a communications module 1412. Exemplary communications modules 1412 (e.g., communications modules 218) include networking interface cards, such as Ethernet cards and modems. In certain aspects, input/output module 1410 is configured to connect to a plurality of devices, such as an input device 1414 (e.g., input device 214) and/or an output device 1416 (e.g., output device 216). Exemplary input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1416 include display devices, such as an LCD (liquid crystal display) monitor, for displaying information to the user.

According to one aspect of the present disclosure, the client 110 and server 130 can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1402 for execution. Such a medium may take many forms, including, but not limited to, non-volatile media, volatile media, and transmission media. Non-volatile media include, for example, optical or magnetic disks, such as data storage device 1406. Volatile media include dynamic memory, such as memory 1404. Transmission media include coaxial cables, copper wire, and fiber optics, including the wires forming bus 1408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
generating texture maps for a subject, based on multiple images including multiple views of the subject under a plurality of lighting conditions, the texture maps including spatially varied expressions and viewpoints across the plurality of lighting conditions;
generating a final texture map based on the texture maps and intensity-defined weights corresponding to the plurality of lighting conditions;
generating, based on the final texture map, a view of the subject illuminated by a light source selected from an environment of the subject; and
providing the view of the subject to an immersive reality application running in a client device.

2. The computer-implemented method of claim 1, wherein generating the texture maps further comprises interpolating a lighting configuration based on a first lighting condition and a second lighting condition available in the multiple images, the texture maps including an expression-dependent texture map and a view-dependent texture map with spatially varied expressions and viewpoints across the plurality of lighting conditions.

3. The computer-implemented method of claim 1, further comprising retrieving the multiple images including the multiple views of the subject from one or more frames from one or more headset mounted cameras facing a user of the client device, wherein the client device is a virtual reality headset.

4. The computer-implemented method of claim 1, wherein generating the texture maps for the subject comprises selecting a lighting configuration for the immersive reality application.

5. The computer-implemented method of claim 1, wherein generating the texture maps for the subject comprises determining a lighting configuration based on an environment map including multiple lighting configurations in the environment of the subject in the immersive reality application.

6. The computer-implemented method of claim 1, wherein generating the texture maps for the subject comprises determining a location of the environment of the subject in the immersive reality application, a subject orientation in the environment, and a view direction.

7. The computer-implemented method of claim 2, wherein generating the texture maps comprises retrieving a shadow map to encode a geometric association between the light source selected from the environment in the immersive reality application and the view-dependent texture map.

8. The computer-implemented method of claim 2, wherein generating the expression-dependent texture map comprises linearly combining multiple expression dependent texture maps based on a lighting condition of the expression-dependent texture map.

9. The computer-implemented method of claim 1, wherein generating the view of the subject comprises identifying a clear shadow boundary from a self-occlusion from a portion of a face of the subject.

10. The computer-implemented method of claim 1, further comprising providing a video of the subject based on animated views of the subject in the immersive reality application.

11. A system, comprising:
a memory storing multiple instructions; and
one or more processors configured to execute the instructions to cause the system to:
generate texture maps for a subject, based on multiple images including multiple views of the subject under a plurality of lighting conditions, the texture maps including spatially varied expressions and viewpoints across the plurality of lighting conditions;
generate a final texture map based on the texture maps and intensity-defined weights corresponding to the plurality of lighting conditions;
generate, based on the final texture map, a view of the subject illuminated by a light source selected from an environment of the subject; and
provide the view of the subject to an immersive reality application running in a client device.

12. The system of claim 11, wherein the one or more processors further execute instructions to generate the texture maps including interpolating a lighting configuration based on a first lighting condition and a second lighting condition available in the multiple images, the texture maps including an expression-dependent texture map and a view-dependent texture map.

13. The system of claim 11, wherein the one or more processors further execute instructions to retrieve the multiple images including the multiple views of the subject from one or more frames from one or more headset mounted cameras facing a user of the client device, wherein the client device is a virtual reality headset.

14. The system of claim 11, wherein to generate the texture maps for the subject the one or more processors execute instructions to select a lighting configuration for the immersive reality application.

15. The system of claim 11, wherein to generate the texture maps for the subject the one or more processors execute instructions to determine a lighting configuration based on an environment map including multiple lighting configurations in the environment of the subject in the immersive reality application.

16. The system of claim 11, wherein to generate the texture maps for the subject the one or more processors execute instructions to determine a location of the environment of the subject in the immersive reality application, a subject orientation in the environment, and a view direction.

17. The system of claim 12, wherein to generate the expression-dependent texture map and the view-dependent texture map for the subject, the one or more processors execute instructions to retrieve a shadow map to encode a geometric association between the light source in the immersive reality application and the view-dependent texture map.

18. The system of claim 12, wherein to generate the expression-dependent texture map the one or more processors execute instructions to linearly combine multiple expression dependent texture maps based on a lighting condition of the expression-dependent texture map.

19. The system of claim 11, wherein to generate the view of the subject the one or more processors execute instructions to identify a clear shadow boundary from a self-occlusion from a portion of a face of the subject.

20. A computer-implemented method for training a model to generate a relightable, three-dimensional representation of a subject, comprising:
generating, with a relightable appearance model, an expression-dependent texture map and a view-dependent texture map for a subject, based on images including multiple views of the subject under multiple space-multiplexed and time-multiplexed illumination patterns;
generating a final texture based on the expression-dependent texture map, the view-dependent texture map, and intensity-defined weights corresponding to the multiple space-multiplexed and the time-multiplexed illumination patterns;
generating, based on the final texture, a synthetic view of the subject illuminated by each of the space-multiplexed and the time-multiplexed illumination patterns;
determining a loss value indicative of a difference between the synthetic view of the subject and at least one of the images;
updating the relightable appearance model based on the loss value; and
generating a three-dimensional relightable representation of the subject based on an updated relightable appearance model.

* * * * *